United States Patent
Lee et al.

(10) Patent No.: US 10,585,794 B2
(45) Date of Patent: Mar. 10, 2020

(54) MEMORY SYSTEM AND OPERATING METHOD OF MEMORY SYSTEM

(71) Applicant: SK hynix Inc., Gyeonggi-do (KR)

(72) Inventors: Jong-Min Lee, Seoul (KR); Duk-Rae Lee, Gyeonggi-do (KR)

(73) Assignee: SK hynix Inc., Gyeonggi-do (KR)

( * ) Notice: Subject to any disclaimer, the term of this patent is extended or adjusted under 35 U.S.C. 154(b) by 49 days.

(21) Appl. No.: 15/914,178

(22) Filed: Mar. 7, 2018

(65) Prior Publication Data
US 2019/0057025 A1    Feb. 21, 2019

(30) Foreign Application Priority Data

Aug. 16, 2017 (KR) .................. 10-2017-0103631

(51) Int. Cl.
*G06F 12/02* (2006.01)
*G06F 3/06* (2006.01)

(52) U.S. Cl.
CPC .......... *G06F 12/0246* (2013.01); *G06F 3/061* (2013.01); *G06F 3/064* (2013.01); *G06F 3/0659* (2013.01); *G06F 3/0679* (2013.01)

(58) Field of Classification Search
CPC ........ G06F 12/02; G06F 3/06; G06F 12/0246; G06F 3/064; G06F 3/0679; G06F 3/061; G06F 3/0659

USPC ......................................................... 711/103
See application file for complete search history.

(56) References Cited

U.S. PATENT DOCUMENTS

| | | | |
|---|---|---|---|
| 2014/0122774 A1* | 5/2014 | Xian ................... | G06F 12/0246 711/103 |
| 2017/0357458 A1* | 12/2017 | de Silva ............... | G06F 3/0619 |

FOREIGN PATENT DOCUMENTS

| | | |
|---|---|---|
| KR | 1020140116387 | 10/2014 |
| KR | 1020160096435 | 8/2016 |
| KR | 1020160112529 | 9/2016 |
| WO | WO-2004059651 A2 * 7/2004 | ........... G06F 3/0613 |
| WO | WO-2017138942 A1 * 8/2017 | ............. G06F 11/30 |

* cited by examiner

*Primary Examiner* — Pierre Miche Bataille
(74) *Attorney, Agent, or Firm* — IP & T Group LLP

(57) ABSTRACT

A memory system includes: a memory device including a plurality of memory blocks each having a plurality of pages suitable for storing data; and a controller suitable for: receiving a plurality of commands from a host; controlling the memory device to perform a plurality of command operations in response to the plurality of commands; identifying parameters for the memory blocks affected by the command operations performed to the memory blocks; selecting first memory blocks among the memory blocks according to the parameters; and controlling the memory device to swap data stored in the first memory blocks to second memory blocks among the memory blocks.

18 Claims, 13 Drawing Sheets

MEMORY SYSTEM AND OPERATING METHOD OF MEMORY SYSTEM

CROSS-REFERENCE TO RELATED APPLICATION

This application claims priority under 35 U.S.C. § 119 to Korean Patent Application No. 10-2017-0103631 filed on Aug. 16, 2017, the disclosure of which is incorporated herein by reference in its entirety.

TECHNICAL FIELD

Exemplary embodiments of the present invention relate to a memory system, and more particularly, to a memory system capable of processing data with a memory device, and a method for operating the memory system.

DISCUSSION OF THE RELATED ART

The computer environment paradigm has changed to ubiquitous computing systems that can be used anytime and anywhere. Due to this fact, use of portable electronic devices such as mobile phones, digital cameras, and notebook computers has rapidly increased. These portable electronic devices generally use a memory system having one or more memory devices for storing data. A memory system may be used as a main memory device or an auxiliary memory device of a portable electronic device.

Memory systems provide excellent stability, durability, high information access speed, and low power consumption since they have no moving parts. Examples of memory systems having such advantages include universal serial bus (USB) memory devices, memory cards having various interfaces, and solid state drives (SSD).

SUMMARY

Embodiments of the present invention are directed to a memory system capable of processing data with a memory device rapidly and stably by minimizing the complexity and performance deterioration of the memory system and maximizing the utility efficiency of the memory device, and a method for operating the memory system.

In accordance with an embodiment of the present invention, a memory system may include: a memory device including a plurality of memory blocks each having a plurality of pages suitable for storing data; and a controller. The controller may be suitable for receiving a plurality of commands from a host; controlling the memory device to perform a plurality of command operations in response to the plurality of commands; identifying parameters for the memory blocks affected by the command operations performed to the memory blocks; selecting first memory blocks among the memory blocks according to the parameters; and controlling the memory device to swap data stored in the first memory blocks to second memory blocks among the memory blocks.

The parameters may include first and second parameters and the controller may set the first memory blocks as a first memory block group and a second memory block group according to the first parameters; control the memory device to perform a first swap operation to the first memory block group; and control the memory device to perform a second swap operation to the second memory block group.

The controller may include a first memory and may be further suitable for assigning a first region for the first swap operation and a second region for the second swap operation in the first memory.

The controller may control the memory device to swap data by determining to perform the first swap operation according to the first parameters; and determining to perform the second swap operation according to offsets of the first parameters.

The controller may be suitable for controlling the memory device to perform the second swap operation with higher priority to the first swap operation. The second swap operation may have greater operating rate than the first swap operation.

The controller may be further suitable for selecting third memory blocks among the memory blocks according to the second parameters; and controlling the memory device to perform a copy operation of copying data stored in the third memory blocks into fourth memory blocks among the memory blocks.

The controller may identify the parameters further by identifying third parameters for the respective third memory blocks and offsets of the third parameters affected by the copy operation performed to the third memory blocks; and control the memory device to swap data further by determining to perform the second swap operation to the third memory blocks according to the third parameters or the offsets of the third parameters.

The controller may be further suitable for assigning a third region for the copy operation in the first memory.

The controller may control the memory device to perform the second swap operation and to perform the copy operation by controlling the memory device to switch between the second swap operation and the copy operation according to the second region and the third region.

The first parameters may be determined according to command operations performed in response to program commands or erase commands provided from the host. The second parameters may be determined according to command operations performed in response to read commands provided from the host.

In accordance with an embodiment of the present invention, an operating method of a memory system, may include: receiving a plurality of commands from a host, the commands for a memory device including a plurality of memory blocks each having a plurality of pages each suitable for storing data; controlling the memory device to perform a plurality of command operations in response to the plurality of commands; identifying parameters for the memory blocks affected by the command operations performed to the memory blocks; selecting first memory blocks among the memory blocks according to the parameters; and controlling the memory device to swap data stored in the first memory blocks to second memory blocks among the memory blocks.

The identifying of the parameters may include identifying first and second parameters for the memory blocks. The controlling of the memory device to swap data may include: setting the first memory blocks as a first memory block group and a second memory block group according to the first parameters; controlling the memory device to perform a first swap operation to the first memory block group; and controlling the memory device to perform a second swap operation to the second memory block group.

The method may further include assigning a first region for the first swap operation and a second region for the second swap operation in a first memory included in a controller of the memory device.

The controlling of the memory device to swap data may include: determining to perform the first swap operation according to the first parameters; and determining to perform the second swap operation according to offsets of the first parameters.

The controlling of the memory device to swap data may include controlling the memory device to perform the second swap operation with higher priority to the first swap operation. The second swap operation may have greater operating rate than the first swap operation.

The method may further include: selecting third memory blocks among the memory blocks according to the second parameters; and controlling the memory device to perform a copy operation of copying data stored in the third memory blocks into fourth memory blocks among the memory blocks.

The identifying of the parameters may further include identifying third parameters for the respective third memory blocks and offsets of the third parameters affected by the copy operation performed to the third memory blocks. The controlling of the memory device to swap data may further include determining to perform the second swap operation to the third memory blocks according to the third parameters or the offsets of the third parameters.

The assigning may further include assigning a third region for the copy operation in the first memory.

The controlling of the memory device to perform the second swap operation and the controlling of the memory device to perform the copy operation may be performed by controlling the memory device to switch between the second swap operation and the copy operation according to the second region and the third region.

The first parameters may be determined according to command operations performed in response to program commands or erase commands provided from the host. The second parameters may be determined according to command operations performed in response to read commands provided from the host.

In accordance with an embodiment of the present invention, a memory system may include: a memory device including a plurality of memory blocks; and a controller suitable for: determining an order of swap operations to be performed to the memory blocks based on erase counts and erase count offsets of the memory blocks; determining an order of copy operations to be performed to the memory blocks based on read counts of the memory blocks; and controlling the memory device to perform the swap and copy operations to the memory blocks such that the swap operations have higher operation priorities to the copy operations, wherein, when a selected one among the swap operations is requested to be performed to selected memory blocks during an ongoing copy operation to the selected memory blocks, the controller controls the memory device to perform the selected swap operation instead of the ongoing copy operation.

BRIEF DESCRIPTION OF THE DRAWINGS

These and other features and advantages of the present invention will become apparent to those skilled in the art to which the present invention pertains from the following detailed description in reference to the accompanying drawings, wherein.

DETAILED DESCRIPTION

Figure 1:
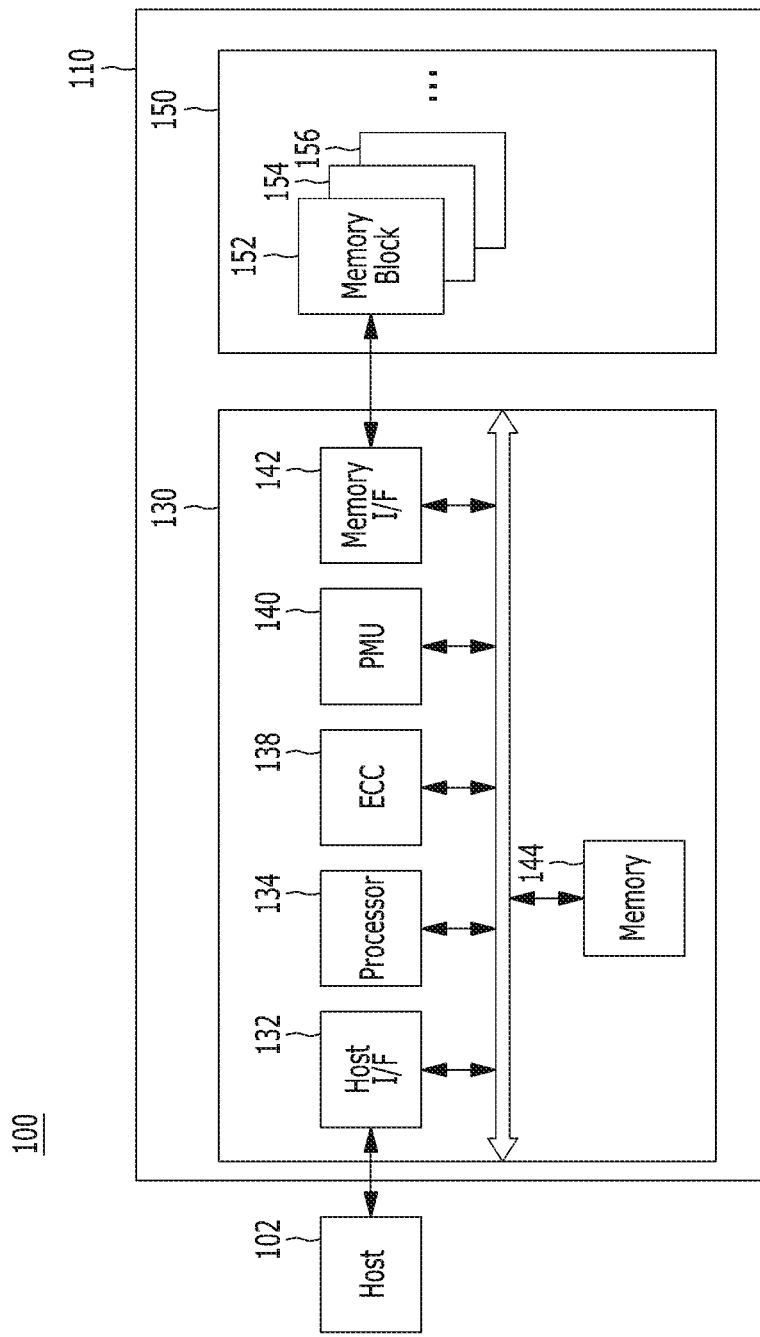
FIG. 1 is a block diagram illustrating a data processing system in accordance with an embodiment of the present invention.

Exemplary embodiments of the present invention will be described below in more detail with reference to the accompanying drawings. The present invention may, however, be embodied in different forms and should not be construed as limited to the embodiments set forth herein. Rather, these embodiments are provided so that this disclosure will be thorough and complete, and will fully convey the scope of the present invention to those skilled in the art. Throughout the disclosure, like reference numerals refer to like parts throughout the various figures and embodiments of the present invention.

It will be understood that, although the terms "first", "second", "third", and so on may be used herein to describe various elements, these elements are not limited by these terms. These terms are used to distinguish one element from another element. Thus, a first element described below could also be termed as a second or third element without departing from the spirit and scope of the present invention.

The drawings are not necessarily to scale and, in some instances, proportions may have been exaggerated in order to clearly illustrate features of the embodiments.

It will be further understood that when an element is referred to as being "connected to", or "coupled to" another element, it may be directly on, connected to, or coupled to the other element, or one or more intervening elements may be present. In addition, it will also be understood that when an element is referred to as being "between" two elements, it may be the only element between the two elements, or one or more intervening elements may also be present.

The terminology used herein is for the purpose of describing particular embodiments only and is not intended to be limiting of the present invention. As used herein, singular forms are intended to include the plural forms as well, unless the context clearly indicates otherwise. It will be further understood that the terms "comprises," "comprising," "includes," and "including" when used in this specification, specify the presence of the stated elements and do not preclude the presence or addition of one or more other elements. As used herein, the term "and/or" includes any and all combinations of one or more of the associated listed items.

Unless otherwise defined, all terms including technical and scientific terms used herein have the same meaning as commonly understood by one of ordinary skill in the art to which the present invention belongs in view of the present disclosure. It will be further understood that terms, such as those defined in commonly used dictionaries, should be interpreted as having a meaning that is consistent with their meaning in the context of the present disclosure and the relevant art and will not be interpreted in an idealized or overly formal sense unless expressly so defined herein.

In the following description, numerous specific details are set forth in order to provide a thorough understanding of the present invention. The present invention may be practiced without some or all of these specific details. In other instances, well-known process structures and/or processes have not been described in detail in order not to unnecessarily obscure the present invention.

It is also noted, that in some instances, as would be apparent to those skilled in the relevant art, a feature or element described in connection with one embodiment may be used singly or in combination with other features or elements of another embodiment, unless otherwise specifically indicated.

FIG. 1 is a block diagram illustrating a data processing system 100 in accordance with an embodiment of the present invention.

Referring to FIG. 1, the data processing system 100 may include a host 102 operatively coupled to a memory system 110.

The host 102 may be any suitable electronic device including a portable electronic device such as a mobile phone, an MP3 player and a laptop computer or a non-portable electronic device such as a desktop computer, a game machine, a TV and a projector.

The host 102 may include at least one OS (operating system), and the OS may manage and control overall functions and operations of the host 102, and provide an operation between the host 102 and a user using the data processing system 100 or the memory system 110. The OS may support functions and operations corresponding to the use purpose and usage of a user. For example, the OS may be divided into a general OS and a mobile OS, depending on the mobility of the host 102. The general OS may be divided into a personal OS and an enterprise OS, depending on the environment of a user. For example, the personal OS configured to support a function of providing a service to general users may include Windows and Chrome, and the enterprise OS configured to secure and support high performance may include Windows server, Linux and Unix. Furthermore, the mobile OS configured to support a function of providing a mobile service to users and a power saving function of a system may include Android, iOS and Windows Mobile. At this time, the host 102 may include a plurality of OSs, and execute an OS to perform an operation corresponding to a user's request on the memory system 110.

The memory system 110 may operate to store data for the host 102 in response to a request. Non-limited examples of the memory system 110 may include a solid-state drive (SSD), a multi-media card (MMC), a secure digital (SD) card, a universal storage bus (USB) device, a universal flash storage (UFS) device, compact flash (CF) card, a smart media card (SMC), a personal computer memory card international association (PCMCIA) card and memory stick. The MMC may include an embedded MMC (eMMC), reduced size MMC (RS-MMC) and micro-MMC. The SD card may include a mini-SD card and micro-SD card.

The memory system 110 may be embodied by various types of storage devices. Non-limited examples of storage devices included in the memory system 110 may include volatile memory devices such as a DRAM dynamic random access memory (DRAM) and a static RAM (SRAM) and nonvolatile memory devices such as a read only memory (ROM), a mask ROM (MROM), a programmable ROM (PROM), an erasable programmable ROM (EPROM), an electrically erasable programmable ROM (EEPROM), a ferroelectric RAM (FRAM), a phase-change RAM (PRAM), a magneto-resistive RAM (MRAM), resistive RAM (RRAM) and a flash memory. The flash memory may have a 3-dimensional (3D) stack structure.

The memory system 110 may include a memory device 150 and a controller 130. The memory device 150 may store data for the host 102, and the controller 130 may control data storage into the memory device 150.

The controller 130 and the memory device 150 may be integrated into a single semiconductor device, which may be included in the various types of memory systems as exemplified above. For example, the controller 130 and the memory device 150 may be integrated as one semiconductor device to constitute an SSD. When the memory system 110 is used as an SSD, the operating speed of the host 102 connected to the memory system 110 can be improved. In addition, the controller 130 and the memory device 150 may be integrated as one semiconductor device to constitute a memory card. For example, the controller 130 and the memory device 150 may constitute a memory card such as a PCMCIA card, CF card, SMC, memory stick, MMC including RS-MMC and micro-MMC, SD card including mini-SD, micro-SD and SDHC, or UFS device.

Non-limited application examples of the memory system 110 may include a computer, an Ultra Mobile PC (UMPC), a workstation, a net-book, a Personal Digital Assistant (PDA), a portable computer, a web tablet, a tablet computer, a wireless phone, a mobile phone, a smart phone, an e-book, a Portable Multimedia Player (PMP), a portable game machine, a navigation system, a black box, a digital camera, a Digital Multimedia Broadcasting (DMB) player, a 3-dimensional television, a smart television, a digital audio recorder, a digital audio player, a digital picture recorder, a digital picture player, a digital video recorder, a digital video player, a storage device constituting a data center, a device capable of transmitting/receiving information in a wireless environment, one of various electronic devices constituting a home network, one of various electronic devices constituting a computer network, one of various electronic devices constituting a telematics network, a Radio Frequency Identification (RFID) device, or one of various components constituting a computing system.

The memory device 150 may be a nonvolatile memory device and may retain data stored therein even though power is not supplied. The memory device 150 may store data provided from the host 102 through a write operation, and provide data stored therein to the host 102 through a read operation. The memory device 150 may include a plurality of memory blocks 152 to 156, each of the memory blocks 152 to 156 may include a plurality of pages, and each of the pages may include a plurality of memory cells coupled to a word line. In an embodiment, the memory device 150 may be a flash memory. The flash memory may have a 3-dimensional (3D) stack structure.

The controller 130 may control the memory device 150 in response to a request from the host 102. For example, the controller 130 may provide data read from the memory device 150 to the host 102, and store data provided from the host 102 into the memory device 150. For this operation, the controller 130 may control read, write, program and erase operations.

The controller 130 may include a host interface (I/F) unit 132, a processor 134, an error correction code (KC) unit 138, a Power Management Unit (PMU) 140, a memory device controller such as a NAND flash controller (NFC) 142 and a memory 144 all operatively coupled via an internal bus.

The host interface unit 132 may be configured to process a command and data of the host 102, and may communicate with the host 102 through one or more of various interface protocols such as universal serial bus (USB), multi-media card (MMC), peripheral component interconnect-express (PCI-E), small computer system interface (SCSI), serial-attached SCSI (SAS), serial advanced technology attachment (SATA), parallel advanced technology attachment (PATA), enhanced small disk interface (ESDI) and integrated drive electronics (IDE).

The ECC unit 138 may detect and correct an error contained in the data read from the memory device 150. In other words, the ECC unit 138 may perform an error correction decoding process to the data read from the memory device 150 through an ECC code used during an ECC encoding process. According to a result of the error correction decoding process, the ECC unit 138 may output a signal, for example, an error correction success/fail signal. When the number of error bits is more than a threshold value of correctable error bits, the ECC unit 138 may not correct the error bits, and may output an error correction fail signal.

The ECC unit 138 may perform error correction through any suitable method including a coded modulation such as Low-Density Parity Check (LDPC) code, Bose-Chaudhuri-Hocquenghem (BCH) code, turbo code, Reed-Solomon code, convolution code, Recursive Systematic Code (RSC), Trellis-Coded Modulation (TCM) and Block coded modulation (BCM). However, the ECC unit 138 is not limited thereto. The ECC unit 138 may include all circuits, modules, systems or devices for error correction.

The PMU 140 may provide and manage power of the controller 130. Any suitable PMU may be employed.

The NFC 142 may serve as a suitable memory/storage interface for interfacing the controller 130 and the memory device 150 such that the controller 130 controls the memory device 150 in response to a request from the host 102. When the memory device 150 is a flash memory or specifically a NAND flash memory, the NFC 142 may generate a control signal for the memory device 150 and process data to be provided to the memory device 150 under the control of the processor 134. The NFC 142 may work as an interface (e.g., a NAND flash interface) for processing a command and data between the controller 130 and the memory device 150. Specifically, the NFC 142 may support data transfer between the controller 130 and the memory device 150. A suitable memory/storage interface may be selected depending upon the type of the memory device 150.

The memory 144 may serve as a working memory of the memory system 110 and the controller 130, and store data for driving the memory system 110 and the controller 130. The controller 130 may control the memory device 150 to perform read, write, program and erase operations in response to a request from the host 102. The controller 130 may provide data read from the memory device 150 to the host 102, may store data provided from the host 102 into the memory device 150. The memory 144 may store data required for the controller 130 and the memory device 150 to perform these operations.

The memory 144 may be embodied by a volatile memory. For example, the memory 144 may be embodied by static random-access memory (SRAM) or dynamic random-access memory (DRAM). The memory 144 may be disposed within or out of the controller 130. FIG. 1 exemplifies the memory 144 disposed within the controller 130. In an embodiment, the memory 144 may be embodied by an external volatile memory having a memory interface transferring data between the memory 144 and the controller 130.

The processor 134 may control the overall operations of the memory system 110. The processor 134 may drive firmware to control the overall operations of the memory system 110. The firmware may be referred to as flash translation layer (FTL). Also, the controller processor 134 may be realized as a microprocessor or a Central Processing Unit (CPU).

In the memory system in accordance with an embodiment of the present invention, the controller 130 may control the memory device 150 to perform a plurality of command operations in response to a plurality of commands, for example, a plurality of program operations in response to a plurality of write commands, a plurality of read operations in response to a plurality of read commands, and a plurality of erase operations in response to a plurality of erase commands, and also the controller 130 may update meta-data, particularly, map data, in response to the performance of the command operations.

Further, the controller 130 may control the memory device 150 to perform a background operation through the processor 134 implemented with a central processing unit (CPU). The background operation to the memory device 150 may include an operation (e.g., the garbage collection operation) of copying data of a memory block into another memory block among the memory blocks 152, 154 and 156; an operation (e.g., the wear levelling operation) of swapping data among the memory blocks 152, 154 and 156; an operation (e.g., the map flush operation) of flushing map data stored in the controller 130 into the memory blocks 152, 154 and 156; and an operation of managing bad memory blocks such as the bad block management operation of detecting a bad memory block among the memory blocks 152, 154 and 156 and processing the detected bad memory block.

In accordance with an embodiment of the present invention, the controller 130 may control the memory device 150 to perform a plurality of command operations (e.g., program operations, read operations and erase operations) to a plurality of memory blocks in response to a plurality of commands (e.g., program commands, read commands and erase commands). The controller 130 may update meta-data, particularly map data, according to the command operations.

When the memory device 150 performs a plurality of command operations (e.g., program operations, read operations and erase operations) in response to a plurality of commands (e.g., program commands, read commands and erase commands), the memory blocks 152, 154 and 156 are deteriorated and the operation reliability of the memory blocks 152, 154 and 156 may be lowered.

In accordance with an embodiment of the present invention, the controller 130 may control the memory device 150 to perform the copy operation and swap operation according to parameters of the memory device 150 affected by the command operations.

In accordance with an embodiment of the present invention, when the controller 130 controls the memory device 150 to perform erase operations in response to the erase commands, each of the plurality of memory blocks may have limited erase count and the erase operations may be performed to the respective memory blocks within corresponding limited erase count. When the memory device 150 performs an erase operation to a particular memory block over the corresponding limited erase count, the memory block may be regarded as a bad block, which cannot be used anymore. The limited erase count may represent a maximum number of erase operations available to a corresponding memory block.

In accordance with an embodiment of the present invention, erase operations may be evenly performed to the plurality of memory blocks within corresponding limited erase counts. Further, in accordance with an embodiment of the present invention, the controller 130 may control the memory device 150 to perform a swap operation or a wear levelling operation to the memory blocks according to parameters of the memory blocks in order to secure operation reliabilities of the memory blocks from the erase operations.

When the memory device 150 repeatedly performs a plurality of read operations to particular memory blocks in response to read commands, there may occur the read disturb in the particular memory blocks due to the repeated read operations. Therefore, the controller 130 may control the memory device 150 to perform a read reclaim operation to the memory blocks in order not to lose data of the particular memory blocks due to the read disturb. During the read reclaim operation, the controller 130 may control the memory device 150 to perform a copy operation of copying data of the particular memory blocks into other memory blocks.

In accordance with an embodiment of the present invention, the controller 130 may control the memory device 150 to perform a swap operation and a copy operation to the memory blocks according to the parameters affected by the command operations performed to the memory blocks in response to the commands. Non-limited examples of the parameters may include the erase count affected by the erase operations, the program count affected by the program operations and the read count affected by the read operation. Further, in accordance with an embodiment of the present invention, the controller 130 may control the memory device 150 to perform a wear levelling operation to memory blocks according to a read reclaim count affected by a copy operation or a read reclaim operation performed to the memory blocks. Described in detail with reference to FIGS. 5 to 9 will be the command operations, the parameters affected by the command operations and the copy and swap operations according to the parameters in accordance with an embodiment of the present invention.

The processor 134 may include a management unit (not illustrated) for controlling the memory device 150 to perform a bad management operation. The management unit may perform a bad block management operation of checking a bad block, in which a program fail occurs due to a characteristic of the memory device, for example, a NAND flash memory during a program operation, among the plurality of memory blocks 152 to 156. The management unit may write the program-failed data of the bad block to a new memory block. In a memory device 150 having a 3D stack structure, the bad block management operation may reduce the use efficiency of the memory device 150 and the reliability of the memory system 110. Thus, the bad block management operation needs to be performed with more reliability.

Figure 2:
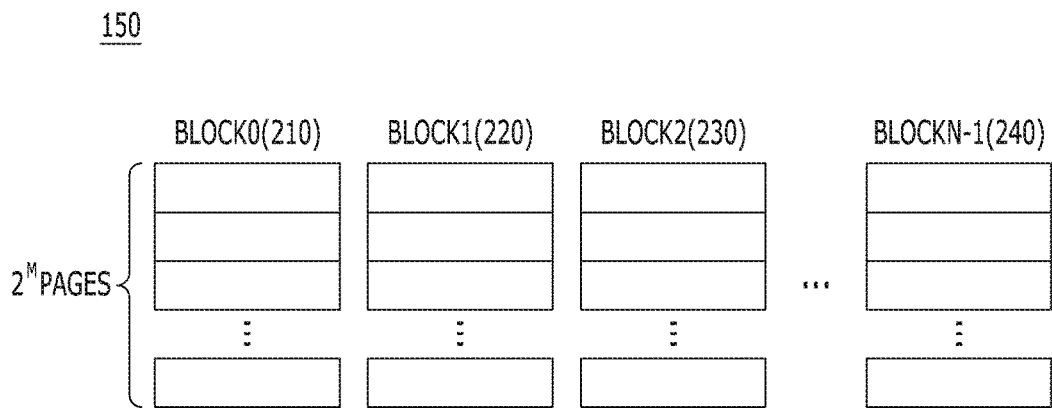
FIG. 2 is a schematic diagram illustrating an exemplary configuration of a memory device employed in a memory system shown in FIG. 1.

FIG. 2 is a schematic diagram illustrating the memory device 150.

Referring to FIG. 2, the memory device 150 may include a plurality of memory blocks 0 to N−1, and each of the blocks 0 to N−1 may include a plurality of pages, for example, $2^M$ pages, the number of which may vary according to circuit design. Memory cells included in the respective memory blocks 0 to N−1 may be one or more of a single level cell (SLC) storing 1-bit data, a multi-level cell (MLC) storing 2-bit data, a triple level cell (TLC) storing 3-bit data, a quadruple level cell (QLC) storing 4-bit level cell, a multiple level cell storing 5-or-more-bit data, and so forth. The SLC memory blocks may have a quick data operation performance and high durability. The MLC memory blocks may have a greater data storing space than the SLC memory blocks. The MLC memory blocks may be highly integrated.

In an embodiment, the memory device 150 may be a nonvolatile memory such as a flash memory. In an embodiment, the memory device 150 may be realized as one or combination of a phase change random access memory (PCRAM), a resistive random access memory (RRAM or ReRAM), a ferroelectric random access memory (FRAM), a spin transfer torque magnetic random access memory (STT-RAM or STT-M RAM).

Figure 3:
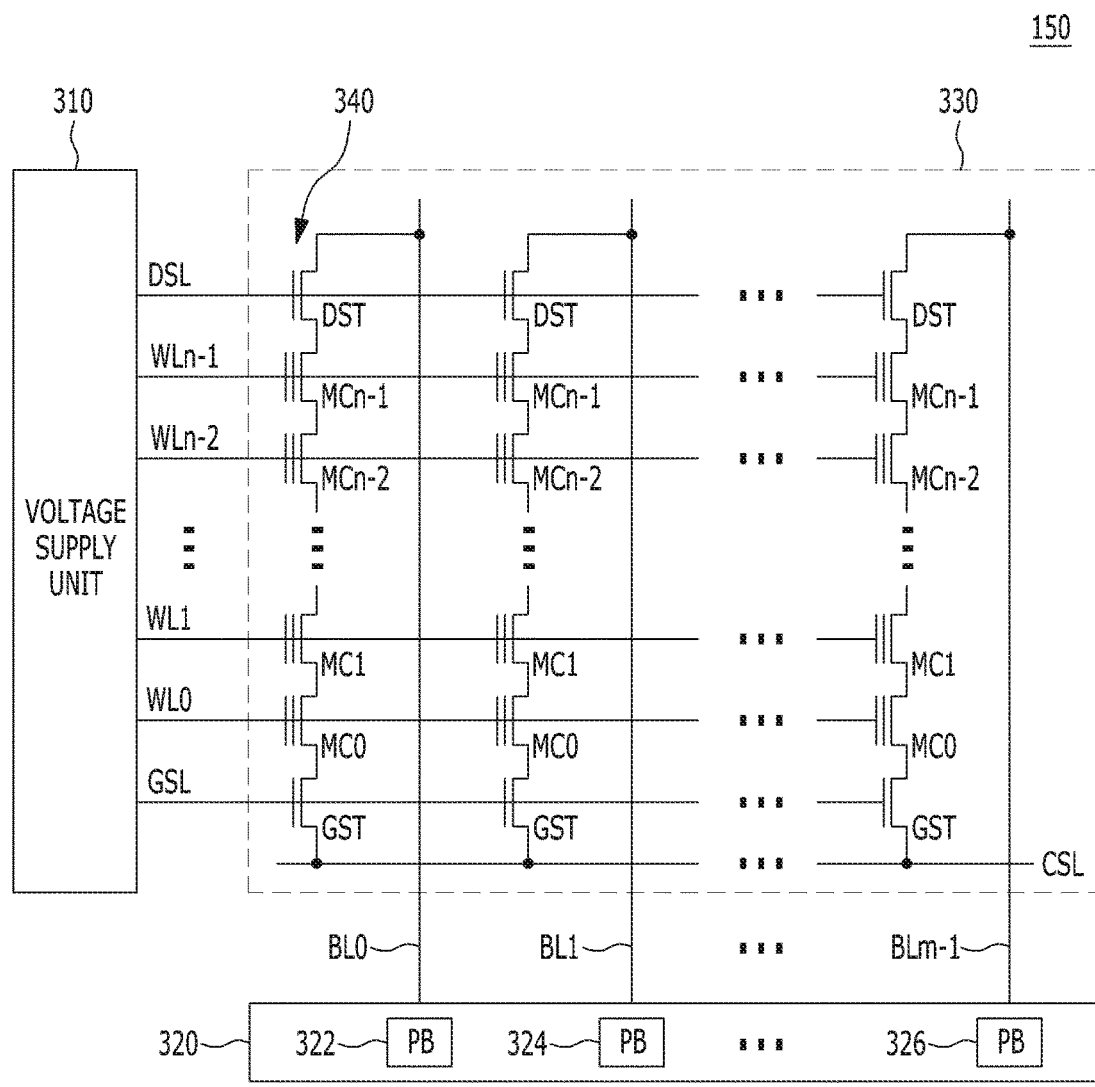
FIG. 3 is a circuit diagram illustrating an exemplary configuration of a memory cell array of a memory block in the memory device shown in FIG. 2.

FIG. 3 is a circuit diagram illustrating an exemplary configuration of a memory cell array of a memory block in the memory device 150.

Referring to FIG. 3, a memory block 330 which may correspond to any of the plurality of memory blocks 152 to 156 may include a plurality of cell strings 340 coupled to a plurality of corresponding bit lines BL0 to BLm−1. The cell string 340 of each column may include one or more drain select transistors DST and one or more source select transistors SST. Between the drain and select transistors DST and SST, a plurality of memory cells MC0 to MCn−1 may be coupled in series. In an embodiment, each of the memory cell transistors MC0 to MCn−1 may be embodied by an MLC capable of storing data information of a plurality of bits. Each of the cell strings 340 may be electrically coupled to a corresponding bit line among the plurality of bit lines BL0 to BLm−1. For example, as illustrated in FIG. 3, the first cell string is coupled to the first bit line BL0, and the last cell string is coupled to the last bit line BLm−1.

Although FIG. 3 illustrates NAND flash memory cells, the invention is not limited in this way. It is noted that the memory cells may be NOR flash memory cells, or hybrid flash memory cells including two or more types of memory cells combined therein. Also, it is noted that the memory device 150 may be a flash memory device including a conductive floating gate as a charge storage layer or a charge trap flash (CTF) memory device including an insulation layer as a charge storage layer.

The memory device 150 may further include a voltage supply unit 310 which provides word line voltages including a program voltage, a read voltage and a pass voltage to supply to the word lines according to an operation mode. The voltage generation operation of the voltage supply unit 310 may be controlled by a control circuit (not illustrated). Under the control of the control circuit, the voltage supply unit 310 may select one of the memory blocks (or sectors) of the memory cell array, select one of the word lines of the selected memory block, and provide the word line voltages to the selected word line and the unselected word lines as may be needed.

The memory device 150 may include a read/write circuit 320 which is controlled by the control circuit. During a verification/normal read operation, the read/write circuit 320 may operate as a sense amplifier for reading data from the memory cell array. During a program operation, the read/write circuit 320 may operate as a write driver for driving bit lines according to data to be stored in the memory cell array. During a program operation, the read/write circuit 320 may receive from a buffer (not illustrated) data to be stored into the memory cell array, and drive bit lines according to the received data. The read/write circuit 320 may include a plurality of page buffers 322 to 326 respectively corresponding to columns (or bit lines) or column pairs (or bit line pairs), and each of the page buffers 322 to 326 may include a plurality of latches (not illustrated).

Figure 4:
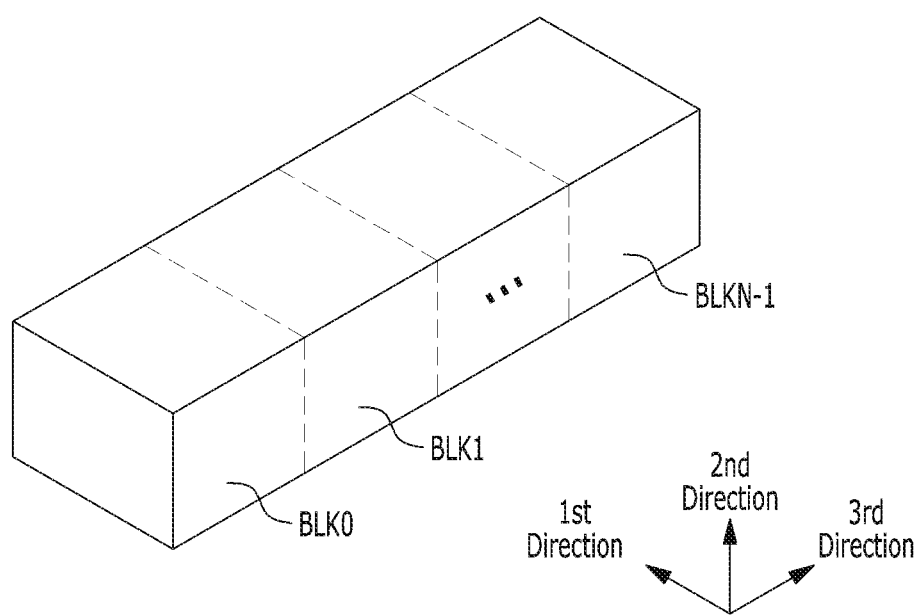
FIG. 4 is a schematic diagram illustrating an exemplary three-dimensional structure of the memory device of FIG. 2.

FIG. 4 is a schematic diagram illustrating an exemplary 3D structure of the memory device 150.

The memory device 150 may be embodied by a 2D or 3D memory device. Specifically, as illustrated in FIG. 4, the memory device 150 may be embodied by a nonvolatile memory device having a 3D stack structure. When the memory device 150 has a 3D structure, the memory device 150 may include a plurality of memory blocks BLK0 to BLKN−1 each having a 3D structure (or vertical structure).

Hereafter, a data processing operation performed into a memory device in the memory system in accordance with an embodiment of the present invention will be described with reference to FIGS. 5 to 9. Particularly, a data processing operation performed during a plurality of command operations in response to a plurality of commands will be described specifically with reference to FIGS. 5 to 9.

FIGS. 5 to 8 illustrate an example of a data processing operation when a plurality of command operations are performed in a memory system in response to a plurality of commands in accordance with an embodiment of the present invention. In this embodiment of the present invention, as an example, a case where a plurality of commands are provided from the host 102 and command operations are performed in the memory system 110 in response to the commands may be described in detail. For example, a case where a plurality of write commands are provided from the host 102 and program operations may be performed in response to the write commands, or a plurality of read commands are provided from the host 102 and read operations are performed in response to the read commands, or a plurality of erase commands are provided from the host 102 and erase operations are performed in response to the erase commands, or a plurality of write commands and a plurality of read commands are provided together from the host 102 and program operations and read operations are performed in response to the write commands and the read commands may be described in detail.

In accordance with an embodiment of the present invention, a case where write data corresponding to a plurality of write commands are stored in a buffer/cache included in the memory 144, and then the data stored in the buffer/cache are programmed and stored in a plurality of memory blocks (in short, program operations are performed), and also map data corresponding to the program operations are updated into the memory device 150 and then the updated map data are stored in the memory blocks is described in an embodiment of the present invention. In short, a case where program operations in response to a plurality of write commands are performed is described. Also, a case where when a plurality of read commands are provided from the host 102 for the data stored in the memory device 150, the data corresponding to the read commands are read from the memory device 150 by detecting the map data for the data corresponding to the read commands and the read data are stored in the buffer/cache included in the memory 144 and the data stored in the buffer/cache are transferred to the host 102 is described in an embodiment of the present invention. In short, a case where read operations in response to the read commands are performed is described in an embodiment of the present invention. Also, a case where when a plurality of erase commands are received from the host 102 for the memory blocks, the memory blocks corresponding to the erase commands are detected and the data stored in the detected memory blocks are erased and the map data corresponding to the erased data are updated and the updated map data are stored in the memory blocks is described in an embodiment of the present invention. In short, a case where erase operations in response to the erase commands are performed is described in an embodiment of the present invention.

Herein, it is assumed in an embodiment of the present invention as an example that the command operations performed in the memory system 110 are performed by the controller 130. However, this is not more than an example and, the processor 134 included in the controller 130, e.g., the FTL, may perform the command operations. Also, in this embodiment of the present invention, the controller 130 may control the memory device 150 to program and store the user data in response to the write commands and metadata in some memory blocks among the memory blocks; to read the user data in response to the read commands and the metadata from the memory blocks storing the user data and the metadata among the memory blocks and transfer the read user data and metadata to the host 102; or to erase the user data corresponding to the erase commands and the metadata from the memory blocks storing the user data and the metadata among the memory blocks.

Herein, the metadata may include a first map data including Logical to Physical (L2P) information (which is called logical information, hereafter) for the data stored in memory blocks through a program operation, and a second map data including Physical to Logical (P2L) information (which is called physical information, hereafter). Also, the metadata may include information on the command data corresponding to a command, information on a command operation in response to the command, information on the memory blocks where the command operation is performed, and information on the map data corresponding to the command operation. In other words, the metadata may include all the other information and data except the user data corresponding to a command.

According to an embodiment of the present invention, the controller 130 may control the memory device 150 to perform command operations in response to a plurality of commands. For example, when the controller 130 receives write commands from the host 102, the controller 130 may control the memory device 150 to perform program operations in response to the write commands. In response to the write commands, the controller 130 may program and store user data in the memory blocks such as empty memory blocks where an erase operation is performed, open memory blocks, or free memory blocks. Also, the controller 130 may control the memory device 150 to program and store mapping information between the logical addresses and the physical addresses for the user data stored in the memory blocks (which are first map data including an L2P map table or an L2P map list containing logical information) and mapping information between the physical addresses and the logical addresses for the memory blocks storing the user data (which are second map data including a P2L map table or a P2L map list containing physical information) in the empty memory blocks, open memory blocks, or free memory blocks among the memory blocks.

When the controller 130 receives write commands from the host 102, the controller 130 may control the memory device 150 to program and store user data in the memory blocks and store metadata that includes the first map data and the second map data for the user data stored in the memory blocks in memory blocks. Particularly, since data segments of the user data are stored in the memory blocks, the controller 130 may generate and update meta segments of the meta data, which are map segments of map data including L2P segments of the first map data and P2L segments of the second map data, and store them in the memory blocks. Herein, the map segments stored in the memory blocks may be loaded onto the memory 144 to be updated.

Also, when the controller 130 receives a plurality of read commands from the host 102, the controller 130 may control the memory device 150 to read out the read data from the memory device 150, store the read data in the buffer/cache included in the memory 144, and transfer the data stored in the buffer/cache to the host 102. In this way, read operations in response to the read commands may be performed.

Also, when the controller 130 receives a plurality of erase commands from the host 102, the controller 130 may detect memory blocks that correspond to the erase commands and perform erase operations onto the detected memory blocks. Hereafter, a data processing operation performed in the memory system in accordance with the embodiments of the present invention is described in detail with reference to FIGS. 5 to 8.

Figure 5:
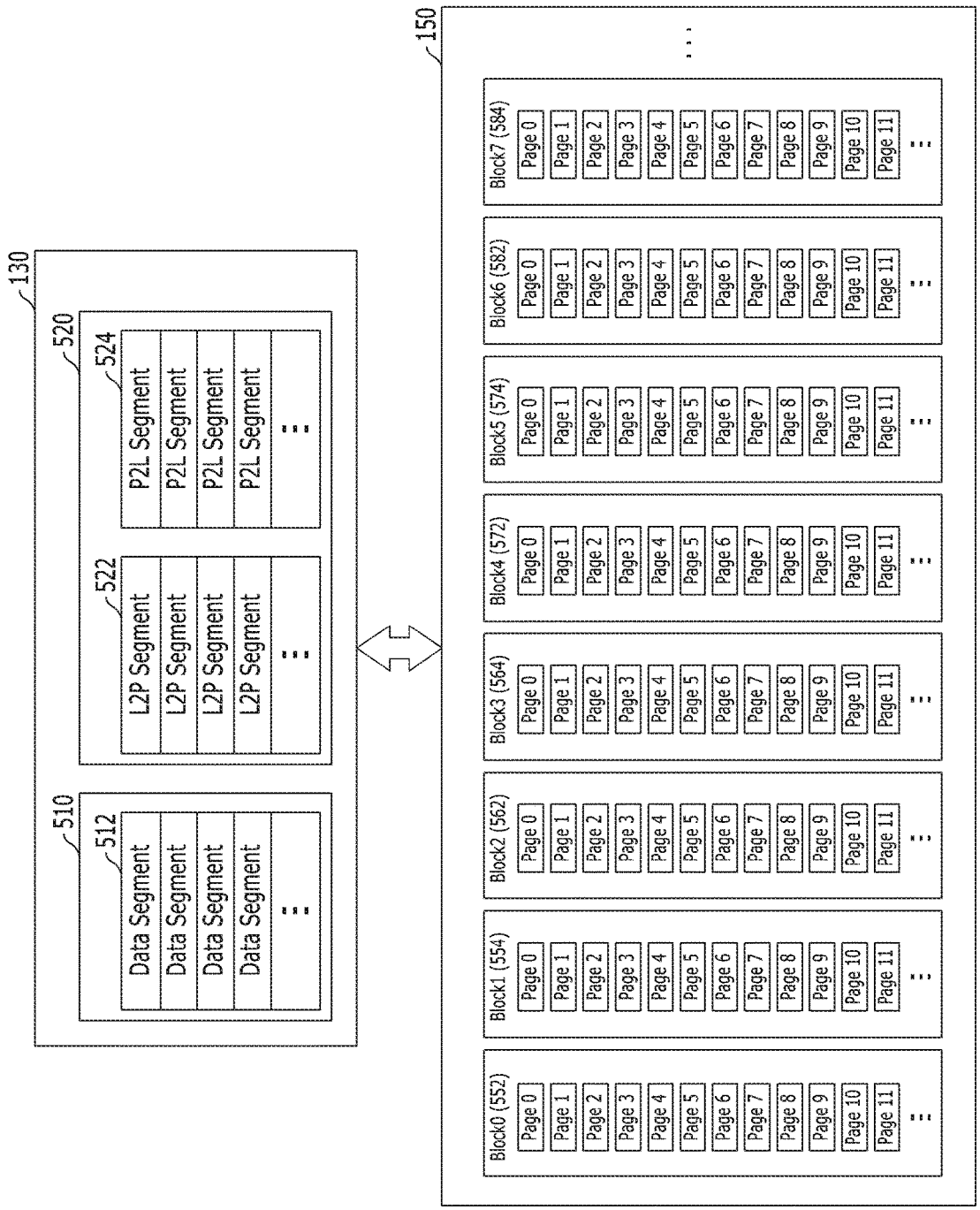
FIGS. 5 to 8 illustrate an example of a data processing operation when a plurality of command operations in response to a plurality of commands are performed in a memory system in accordance with an embodiment of the present invention.

Referring to FIG. 5, the controller 130 may control the memory device 150 to perform command operations in response to a plurality of commands. For example, the controller 130 may control the memory device 150 to perform program operations in response to a plurality of write commands. In response to the write commands, the controller 130 may control the memory device 150 to program and store user data in memory blocks 552, 554, 562, 564, 572, 574, 582 and 584, and generate and update metadata for the user data when the program operation is performed onto the memory blocks 552, 554, 562, 564, 572, 574, 582 and 584, and then store the generated and updated metadata in the memory blocks 552, 554, 562, 564, 572, 574, 582 and 584.

Herein, the controller 130 may generate and update information representing that the user data are stored in the pages included in the memory blocks 552, 554, 562, 564, 572, 574, 582 and 584, e.g., the first map data and the second map data, and store the generated and updated information in the pages included in the memory blocks 552, 554, 562, 564, 572, 574, 582 and 584. In other words, the controller 130 may generate and update logical segments of the first map data, which include L2P segments, and physical segments of the second map data, which include P2L segments, and store the generated and updated logical segments in the pages included in the memory blocks 552, 554, 562, 564, 572, 574, 582 and 584.

For example, the controller 130 may cache and buffer the user data corresponding to the write commands in the first buffer 510 included in the memory 144, in other words, the controller 130 may store the data segments 512 of the user data in the first buffer 510, which is a data buffer/cache, and store the data segments 512 stored in the first buffer 510 in the pages included in the memory blocks 552, 554, 562, 564, 572, 574, 582 and 584. Since the data segments 512 of the user data corresponding to the write commands are programmed and stored in the pages included in the memory blocks 552, 554, 562, 564, 572, 574, 582 and 584, the controller 130 may generate and update the first map data and the second map data and store them in the second buffer 520 included in the memory 144. In short, the controller 130 may store the L2P segments 522 of the first map data and the P2L segments 524 of the second map data for the user data in the second buffer 520, which is a map buffer/cache. Herein, the L2P segments 522 of the first map data and the P2L segments 524 of the second map data or a map list for the L2P segments 522 of the first map data and a map list for the P2L segments 524 of the second map data may be stored in the second buffer 520 in the memory 144. Also, the controller 130 may store the L2P segments 522 of the first map data and the P2L segments 524 of the second map data that are stored in the second buffer 520 in the pages stored in the memory blocks 552, 554, 562, 564, 572, 574, 582 and 584.

Also, the controller 130 may control the memory device 150 to perform command operations in response to a plurality of commands. For example, the controller 130 may perform read operations in response to a plurality of read commands. Herein, the controller 130 may load and check out the map segments of the map data for the user data corresponding to the read commands, e.g., the L2P segments 522 of the first map data and the P2L segments 524 of the second map data, onto the second buffer 520, and then read the user data stored in the pages of the corresponding memory blocks among the memory blocks 552, 554, 562, 564, 572, 574, 582 and 584, store the data segments 512 of the read user data in the first buffer 510, and transfer them to the host 102.

Also, the controller 130 may perform command operations in response to a plurality of commands. In other words, the controller 130 may perform erase operations in response to a plurality of erase commands. Herein, the controller 130 may detect memory blocks in response to the erase commands among the memory blocks 552, 554, 562, 564, 572, 574, 582 and 584, and perform the erase operations onto the detected memory blocks.

When a background operation, for example, an operation such as a garbage collection operation or a wear-levelling operation of copying data or swapping data from the memory blocks is performed, the controller 130 may store the data segments 512 of the corresponding user data in the first buffer 510, load the map segments 522 and 524 of the map data corresponding to the user data onto the second buffer 520, and perform the garbage collection operation or the wear-levelling operation.

Figure 6:
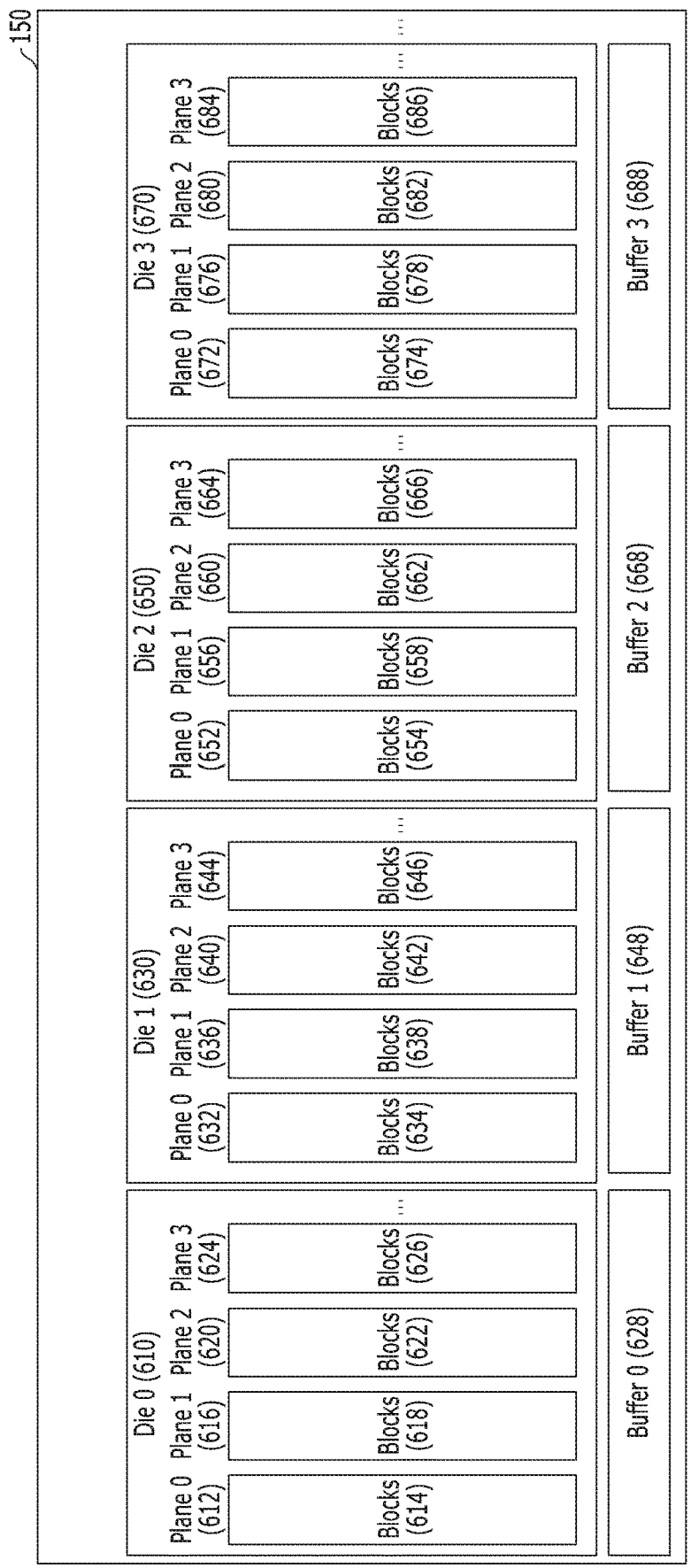

Also, referring to FIG. 6, the memory device 150 may include a plurality of memory dies, e.g., a memory die 0 610, a memory die 1 630, a memory die 2 650, and a memory die 3 670. Each of the memory dies 610, 630, 650 and 670 may include a plurality of planes. For example, the memory die 0 610 may include a plane 0 612, a plane 1 616, a plane 2 620 and a plane 3 624. The memory die 1 630 may include a plane 0 632, a plane 1 636, a plane 2 640 and a plane 3 644. The memory die 2 650 may include a plane 0 652, a plane 1 656, a plane 2 660 and a plane 3 664. The memory die 3 670 may include a plane 0 672, a plane 1 676, a plane 2 680 and a plane 3 684. Each of the planes 612 to 684 of the memory dies 610, 630, 650 and 670 may include a plurality of memory blocks 614, 618, 622, 626, 634, 638, 642, 646, 654, 658, 662, 666, 674, 678, 682 and 686. For example, as described earlier with reference to FIG. 2, each of the planes 612 to 684 may include N blocks Block 0, Block 1, . . . , Block N−1, each block including a plurality of pages, e.g., $2^M$ pages. Also, the memory device 150 may include a plurality of buffers that respectively correspond to the memory dies 610, 630, 650 and 670. For example, the memory device 150 may include a buffer 0 628 corresponding to the memory die 0 610, a buffer 1 648 corresponding to the memory die 1 630, a buffer 2 668 corresponding to the memory die 2 650, and a buffer 3 688 corresponding to the memory die 3 670.

When a command operation is performed in response to a respective command, the data corresponding to the command operation may be stored in at least one of the buffers 628, 648, 668 and 688. For example, when a program operation is performed, the data corresponding to the program operation may be stored in at least one of the buffers 628, 648, 668 and 688, and then stored in one or more pages included in at least one memory block of at least one memory die 610, 630, 650 and 670. When a read operation is performed, the data corresponding to the read operation may be read from one or more pages included in at least one memory block of at least one memory die 610, 630, 650 and 670, stored in at least one of the buffers 628, 648, 668 and 688, and transferred to the host 102 through the controller 130.

Herein, in an embodiment of the present invention, as an example, a case where the buffers 628, 648, 668 and 688 exist in the outside of the corresponding memory dies 610, 630, 650 and 670 is described. However, it is noted that in a modified embodiment the buffers 628, 648, 668 and 688 may exist in the inside of the corresponding memory dies 610, 630, 650 and 670. Also, each of the buffers 628, 648, 668 and 688 may correspond to the planes and the memory blocks of a respective memory die among the memory dies 610, 630, 650 and 670. For example, as illustrated in FIG. 6, BUFFER 628 corresponds to memory die and may temporarily store data to and from the pages of the memory blocks of the planes of the memory die 610. The buffers 628, 648, 668 and 688 may be an embodiment of the page buffers 322 to 326 of FIG. 3. In an embodiment, the buffers 628, 648, 668 and 688 may be caches or registers.

In an embodiment, the memory blocks 614 to 686 may be grouped into a plurality of super memory blocks, and a command operation may be performed onto one or more of the super memory blocks. Herein, each of the super memory blocks may include a plurality of memory blocks, for example, memory blocks included in a first memory block group and a second memory block group. Herein, when the first memory block group is included in a first plane of a first memory die, the second memory block group may be included in the first plane of the first memory die or a second plane of the first memory die. Also, the second memory block group may be included in a plane of at least one of the second, third and the fourth memory die.

Hereafter, an operation of identifying parameters for the plurality of memory blocks and swapping and copying in the plurality of memory blocks according to the parameters, as the command operations are performed in response to the plurality of commands in the memory system in accordance with an embodiment of the present invention will be described in detail by taking an example with reference to FIGS. 7 and 8.

Figure 7:
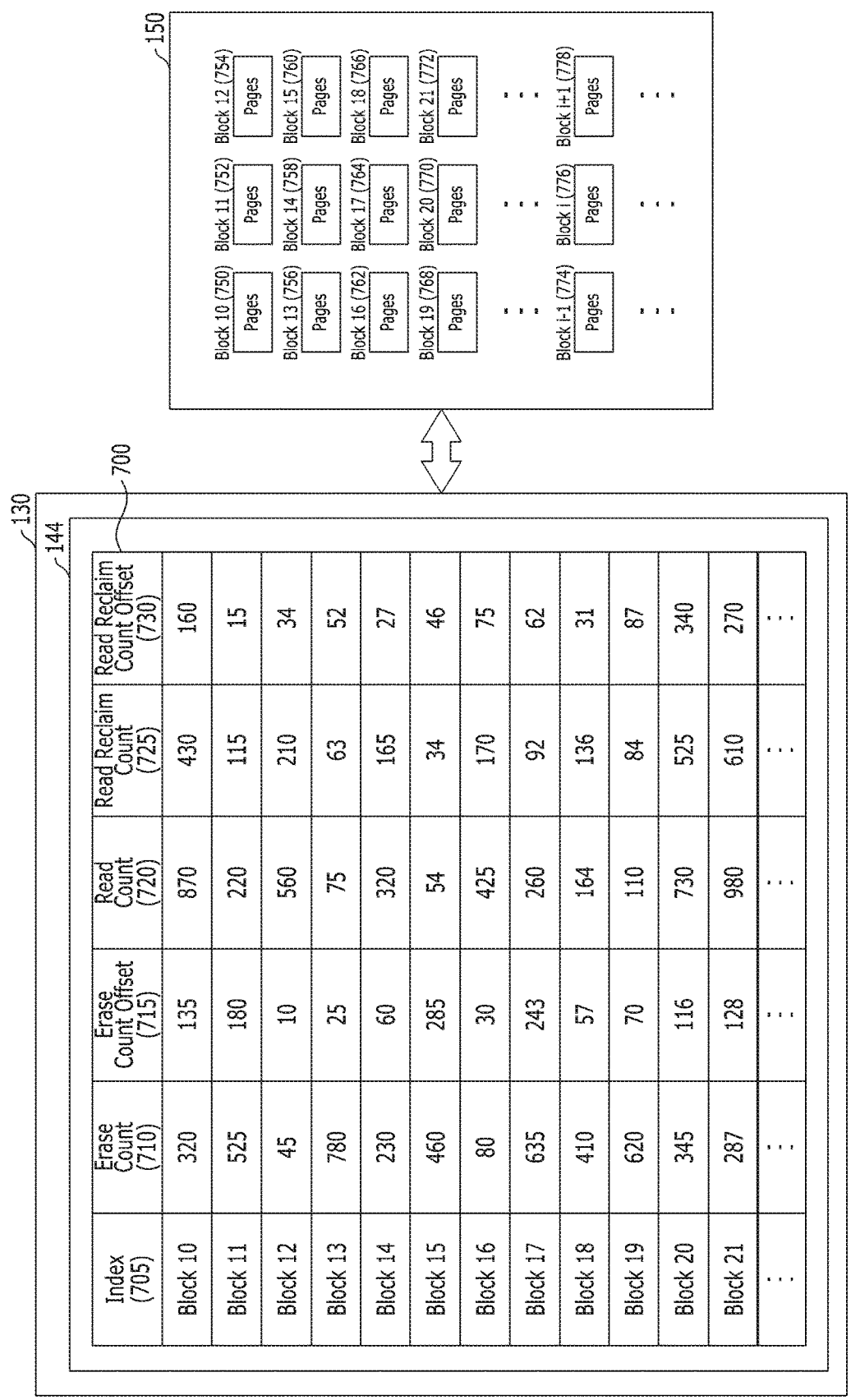

Referring to FIG. 7, the controller 130 may control the memory device 150 to perform a plurality of command operations (e.g., program operations, read operations and erase operations) to a plurality of memory blocks in response to a plurality of commands (e.g., program commands, read commands and erase commands). The controller 130 may control the memory device 150 to perform a copy operation (e.g., a read reclaim operation) and a swap operation (e.g., a wear levelling operation) according to parameters of the memory blocks affected by the command operations performed to the memory blocks. The controller 130 may control the memory device 150 to perform a swap operation (e.g., a wear levelling operation) to the memory blocks according to the parameters affected by a copy operation (e.g., a read reclaim operation) performed to the memory blocks.

In response to commands, the controller 130 may control the memory device 150 to perform command operations to memory blocks, for example, a memory block 10 750, a memory block 11 752, a memory block 12 754, a memory block 13 756, a memory block 14 758, a memory block 15 760, a memory block 16 762, a memory block 17 764, a memory block 18 766, a memory block 19 768, a memory block 20 770 and a memory block 21 772. According to the command operations performed to the memory blocks 750, 752, 754, 756, 758, 760, 762, 764, 766, 768, 770 and 772, the controller 130 may identify parameters of the respective memory blocks 750, 752, 754, 756, 758, 760, 762, 764, 766, 768, 770 and 772. The controller 130 may store into a parameter table 700 by indexes 705 the parameters of the respective memory blocks 750, 752, 754, 756, 758, 760, 762, 764, 766, 768, 770 and 772. The parameter table 700 may be a meta-data for the memory device 150, and may be stored in the second buffer 520 of the memory 144 as well as in the memory device 150.

For example, the controller 130 may control the memory device 150 to perform a plurality of erase operations to the memory blocks 750, 752, 754, 756, 758, 760, 762, 764, 766, 768, 770 and 772 in response to a plurality of erase commands. The controller 130 may store in the parameter table 700 erase counts 710 for the respective memory blocks 750, 752, 754, 756, 758, 760, 762, 764, 766, 768, 770 and 772 according to the erase operations performed to the memory blocks 750, 752, 754, 756, 758, 760, 762, 764, 766, 768, 770 and 772. That is, when the controller 130 controls the memory device 150 to perform erase operations to the memory blocks 750, 752, 754, 756, 758, 760, 762, 764, 766, 768, 770 and 772, the controller 130 may identify the erase counts 710 for the respective memory blocks 750, 752, 754, 756, 758, 760, 762, 764, 766, 768, 770 and 772 and store in the parameter table 700 the erase counts 710 for the respective memory blocks 750, 752, 754, 756, 758, 760, 762, 764, 766, 768, 770 and 772 according to the indexes 705.

Then, the controller 130 may obtain an average erase count for the memory blocks 750, 752, 754, 756, 758, 760, 762, 764, 766, 768, 770 and 772. That is, the controller 130 may obtain an average erase count for the memory blocks 750, 752, 754, 756, 758, 760, 762, 764, 766, 768, 770 and 772 through the erase counts 710 of the respective memory blocks 750, 752, 754, 756, 758, 760, 762, 764, 766, 768, 770 and 772 stored in the parameter table 700 according to the indexes 705.

Further, when the memory device 150 performs erase operations to the memory blocks 750, 752, 754, 756, 758, 760, 762, 764, 766, 768, 770 and 772, the controller 130 may identify erase count offsets 715 of the erase counts 710 for the respective memory blocks 750, 752, 754, 756, 758, 760, 762, 764, 766, 768, 770 and 772. That is, the controller 130 may identify variations (i.e., increases and decreases) of the erase counts 710 for the respective memory blocks 750, 752, 754, 756, 758, 760, 762, 764, 766, 768, 770 and 772. Then, the controller 130 may store in the parameter table 700 as erase count offsets 715 the variations of the erase counts 710 for the respective memory blocks 750, 752, 754, 756, 758, 760, 762, 764, 766, 768, 770 and 772. The controller 130 may identify the erase count offsets 715 for the respective memory blocks 750, 752, 754, 756, 758, 760, 762, 764, 766, 768, 770 and 772, and then store in the parameter table 700 the erase count offsets 715 according to the indexes 705.

As described above, in an embodiment, the host 102 may provide a plurality of erase commands to the memory system and in response the controller 130 controls the memory device 150 to perform a plurality of erase operations to the memory blocks 750, 752, 754, 756, 758, 760, 762, 764, 766, 768, 770 and 772. The controller 130 may also identify erase counts 710 and erase count offsets 715, which are affected by the erase operations, for the respective memory blocks 750, 752, 754, 756, 758, 760, 762, 764, 766, 768, 770 and 772 and store in the parameter table 700 the erase counts 710 and erase count offsets 715 according to the indexes 705. The host 102 may further provide a plurality of program commands to the memory system 110 and the controller 130 in response may control the memory device 150 to perform a plurality of program operations to the memory blocks 750, 752, 754, 756, 758, 760, 762, 764, 766, 768, 770 and 772. The controller 130 may also identify program counts and program count offsets, which are affected by the program operations, for the respective memory blocks 750, 752, 754, 756, 758, 760, 762, 764, 766, 768, 770 and 772 and store them in the parameter table 700 according to the indexes 705. The controller 130 may also obtain an average program count for the memory blocks 750, 752, 754, 756, 758, 760, 762, 764, 766, 768, 770 and 772. That is, the controller 130 may obtain an average program count for the memory blocks 750, 752, 754, 756, 758, 760, 762, 764, 766, 768, 770 and 772 through the program counts of the respective memory blocks 750, 752, 754, 756, 758, 760, 762, 764, 766, 768, 770 and 772 stored in the parameter table 700 according to the indexes 705. Hence, the controller 130 may store in the parameter table 700 the program/erase counts (or program/erase cycles or erase/write cycles) and program/erase count offsets (or program/erase cycle offsets or erase/write cycle offsets) for the respective memory blocks 750, 752, 754, 756, 758, 760, 762, 764, 766, 768, 770 and 772 according to the indexes 705.

The controller 130 may control the memory device 150 to perform a plurality of read operations to the memory blocks 750, 752, 754, 756, 758, 760, 762, 764, 766, 768, 770 and 772 in response to a plurality of read commands received from the host 102. The controller 130 may store in the parameter table 700 read counts 720 for the respective memory blocks 750, 752, 754, 756, 758, 760, 762, 764, 766, 768, 770 and 772 according to the read operations performed to the memory blocks 750, 752, 754, 756, 758, 760, 762, 764, 766, 768, 770 and 772. That is, when the controller 130 controls the memory device 150 to perform read operations to the memory blocks 750, 752, 754, 756, 758, 760, 762, 764, 766, 768, 770 and 772, the controller 130 may identify the read counts 720 for the respective memory blocks 750, 752, 754, 756, 758, 760, 762, 764, 766, 768, 770 and 772 and store in the parameter table 700 the read counts 720 for the respective memory blocks 750, 752, 754, 756, 758, 760, 762, 764, 766, 768, 770 and 772 according to the indexes 705.

Then, the controller 130 may obtain an average read count for the memory blocks 750, 752, 754, 756, 758, 760, 762, 764, 766, 768, 770 and 772. That is, the controller 130 may obtain an average read count for the memory blocks 750, 752, 754, 756, 758, 760, 762, 764, 766, 768, 770 and 772 through the read counts 720 of the respective memory blocks 750, 752, 754, 756, 758, 760, 762, 764, 766, 768, 770 and 772 stored in the parameter table 700 according to the indexes 705.

When the memory device 150 repeatedly performs a plurality of read operations to the memory blocks 750, 752, 754, 756, 758, 760, 762, 764, 766, 768, 770 and 772 in response to read commands, there may occur the read disturb in the memory blocks 750, 752, 754, 756, 758, 760, 762, 764, 766, 768, 770 and 772 due to the repeated read operations. Therefore, the controller 130 may control the memory device 150 to perform a read reclaim operation (i.e., a copy operation) to the memory blocks 750, 752, 754, 756, 758, 760, 762, 764, 766, 768, 770 and 772 according to the read counts 720 for the memory blocks 750, 752, 754, 756, 758, 760, 762, 764, 766, 768, 770 and 772. That is, the controller 130 may control the memory device 150 to perform read reclaim operations to the memory blocks 750, 752, 754, 756, 758, 760, 762, 764, 766, 768, 770 and 772 according to the read counts 720 for the respective memory blocks 750, 752, 754, 756, 758, 760, 762, 764, 766, 768, 770 and 772. Then, the controller 130 may identify read reclaim counts 725 for the respective memory blocks 750, 752, 754, 756, 758, 760, 762, 764, 766, 768, 770 and 772. Then, the controller 130 may store in the parameter table 700 the read reclaim counts 725 for the respective memory blocks 750, 752, 754, 756, 758, 760, 762, 764, 766, 768, 770 and 772 according to the indexes 705. Then, the controller 130 may obtain an average read reclaim count for the memory blocks 750, 752, 754, 756, 758, 760, 762, 764, 766, 768, 770 and 772. That is, the controller 130 may obtain an average read reclaim count for the memory blocks 750, 752, 754, 756, 758, 760, 762, 764, 766, 768, 770 and 772 through the read reclaim counts 725 of the respective memory blocks 750, 752, 754, 756, 758, 760, 762, 764, 766, 768, 770 and 772 stored in the parameter table 700 according to the indexes 705.

Further, when the memory device 150 performs read reclaim operations to the memory blocks 750, 752, 754, 756, 758, 760, 762, 764, 766, 768, 770 and 772, the controller 130 may identify read reclaim count offsets 730 of the read reclaim counts 725 for the respective memory blocks 750, 752, 754, 756, 758, 760, 762, 764, 766, 768, 770 and 772. That is, the controller 130 may identify variations (i.e., increases and decreases) of the read reclaim counts 725 for the respective memory blocks 750, 752, 754, 756, 758, 760, 762, 764, 766, 768, 770 and 772. Then, the controller 130 may store in the parameter table 700 as read reclaim count offsets 730 the variations of the read reclaim counts 725 for the respective memory blocks 750, 752, 754, 756, 758, 760, 762, 764, 766, 768, 770 and 772. The controller 130 may identify the read reclaim count offsets 730 for the respective memory blocks 750, 752, 754, 756, 758, 760, 762, 764, 766, 768, 770 and 772, and then store in the parameter table 700 the read reclaim count offsets 730 according to the indexes 705.

Further, when the memory device 150 performs erase operations or program operations to the memory blocks 750, 752, 754, 756, 758, 760, 762, 764, 766, 768, 770 and 772, the controller 130 may initialize the read counts 720, read reclaim counts 725 and read reclaim count offsets 730 for the respective memory blocks 750, 752, 754, 756, 758, 760, 762, 764, 766, 768, 770 and 772 stored in the parameter table 700.

Described hereinafter in detail with reference to FIG. 8 will be swap operation and copy operation according to the parameters of the parameter table 700 affected by the command operations performed to the memory blocks 750, 752, 754, 756, 758, 760, 762, 764, 766, 768, 770 and 772 in accordance with an embodiment of the present invention.

Figure 8:
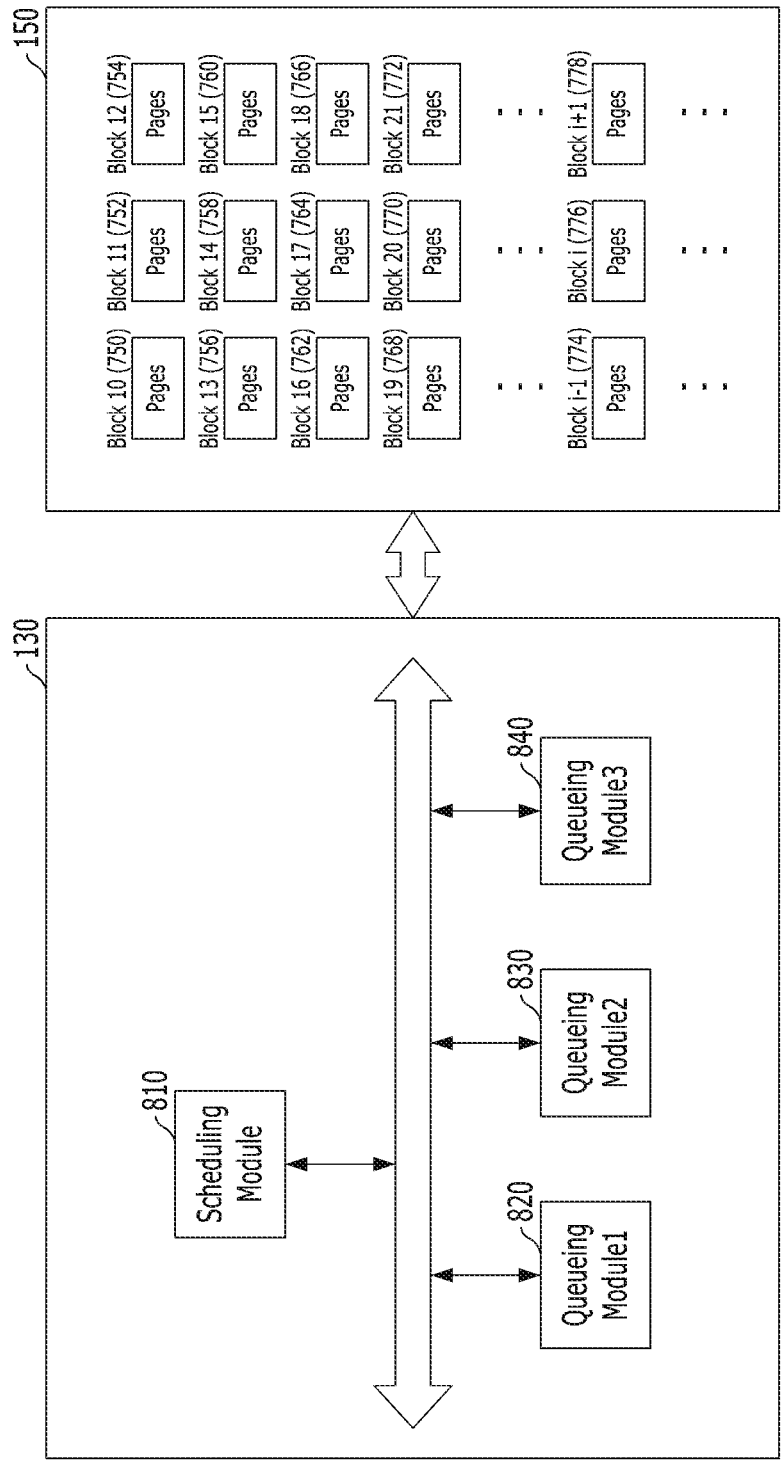

Referring to FIG. 8, the controller 130 may include a scheduling module 810 and first to third queuing modules 820, 830 and 840. The scheduling module 810 may schedule queues in the memory 144 for swap and copy operations to be performed according to the parameters of the parameter table 700 for the memory blocks 750, 752, 754, 756, 758, 760, 762, 764, 766, 768, 770 and 772 and assign the first to third queuing modules 820, 830 and 840 to the memory 144.

The scheduling module 810 may be implemented with the processor 134. That is, the processor 134, particularly, the FTL may schedule queues in the memory 144 for swap and copy operations to be performed according to the parameters of the parameter table 700 for the memory blocks 750, 752, 754, 756, 758, 760, 762, 764, 766, 768, 770 and 772. The first to third queuing modules 820, 830 and 840 may be regions of the memory 144 storing data as targets of the swap and copy operations when the controller 130 controls the memory device 150 to perform the swap and copy operations to the memory blocks 750, 752, 754, 756, 758, 760, 762, 764, 766, 768, 770 and 772. The first to third queuing modules 820, 830 and 840 may be buffers or caches included in the memory 144. Although only three modules, i.e., the first to third queuing modules 820, 830 and 840 are illustrated in FIG. 8, it is noted that a different number of queueing modules may also be employed without departing from the scope of the present invention. According to the various types swap or copy operations performed to the memory blocks 750, 752, 754, 756, 758, 760, 762, 764, 766, 768, 770 and 772, the priorities of the operations may be determined and queues may be scheduled in the memory 144 for the respective types of the swap or copy operations according to the determined priorities. A plurality of queueing modules may be assigned for storing target data for the respective types of the swap or copy operations.

The first queueing module 820 may store target data of swap operations when the controller 130 controls the memory device 150 to perform the swap operations (e.g., wear levelling operations) to the memory blocks 750, 752, 754, 756, 758, 760, 762, 764, 766, 768, 770 and 772 according to the erase counts 710 stored in the parameter table 700. The first queueing module 820 may store target data of swap operations when the controller 130 controls the memory device 150 to perform normal priority swap operations to the memory blocks 750, 752, 754, 756, 758, 760, 762, 764, 766, 768, 770 and 772 according to the erase counts 710 stored in the parameter table 700. At this time, normal priority queues may be assigned to the first queueing module 820. The first queueing module 820 may store the parameter table 700 including the erase counts 710.

The second queueing module 830 may store target data of swap operations when the controller 130 controls the memory device 150 to perform the swap operations (e.g., wear levelling operations) to the memory blocks 750, 752, 754, 756, 758, 760, 762, 764, 766, 768, 770 and 772 according to the erase counts 710 and the erase count offsets 715 stored in the parameter table 700. Further, the second queueing module 830 may store target data of swap operations when the controller 130 controls the memory device 150 to perform the swap operations (e.g., wear levelling operations) to the memory blocks 750, 752, 754, 756, 758, 760, 762, 764, 766, 768, 770 and 772 according to the read reclaim counts 725 and the read reclaim count offsets 730 stored in the parameter table 700. The second queueing module 830 may store target data of high priority swap operations when the controller 130 controls the memory device 150 to perform high priority swap operations to the memory blocks 750, 752, 754, 756, 758, 760, 762, 764, 766, 768, 770 and 772. At this time, high priority queues may be assigned to the second queueing module 830. The second queueing module 830 may store the parameter table 700 including the erase counts 710, erase count offsets 715, read reclaim counts 725 and read reclaim count offsets 730. When the controller 130 controls the memory device 150 to perform the high priority swap operations to the memory blocks 750, 752, 754, 756, 758, 760, 762, 764, 766, 768, 770 and 772, the controller 130 controls the memory device 150 to perform the high priority swap operations with greater operating rate than the normal priority swap operations. For example, the controller 130 controls the memory device 150 to perform the high priority swap operations with greater operation speed or trigger frequency. That is, the high priority swap operations may have greater operating rate than the normal priority swap operations.

The third queueing module 840 may store target data of copy operations when the controller 130 controls the memory device 150 to perform the copy operations (e.g., read reclaim operations) to the memory blocks 750, 752, 754, 756, 758, 760, 762, 764, 766, 768, 770 and 772 according to the read counts 720 stored in the parameter table 700. The third queueing module 840 may store target data of copy operations when the controller 130 controls the memory device 150 to perform copy operations to the memory blocks 750, 752, 754, 756, 758, 760, 762, 764, 766, 768, 770 and 772 according to the read counts 720 stored in the parameter table 700. At this time, normal or high priority queues may be assigned to the third queueing module 840. The third queueing module 840 may store the parameter table 700 including the read counts 720. Described hereinafter in detail, as an example, will be an operation of comparing average parameters or threshold parameters with the parameters for the memory blocks 750, 752, 754, 756, 758, 760, 762, 764, 766, 768, 770 and 772; and swap and copy operations performed to the memory blocks 750, 752, 754, 756, 758, 760, 762, 764, 766, 768, 770 and 772 according to the result of the comparison.

For example, the controller 130 may compare an average erase count or a threshold erase count with the erase counts 710 of the parameter table 700 for the respective memory blocks 750, 752, 754, 756, 758, 760, 762, 764, 766, 768, 770 and 772, and may control the memory device 150 to perform a swap operation (i.e., a wear levelling operation) to the memory blocks 750, 752, 754, 756, 758, 760, 762, 764, 766, 768, 770 and 772 according to the result of the comparison between the average erase count or the threshold erase count and the erase counts 710. Also, the controller 130 may compare an average erase count offset or a threshold erase count offset with the erase count offsets 715 of the parameter table 700 for the respective memory blocks 750, 752, 754, 756, 758, 760, 762, 764, 766, 768, 770 and 772, and may control the memory device 150 to perform a swap operation (i.e., a wear levelling operation) to the memory blocks 750, 752, 754, 756, 758, 760, 762, 764, 766, 768, 770 and 772 according to the result of the comparison between the average erase count offset or the threshold erase count offset and the erase count offsets 715.

The controller 130 may obtain the average erase count for the memory blocks 750, 752, 754, 756, 758, 760, 762, 764, 766, 768, 770 and 772. When the average erase count is 370, the controller 130 may select memory blocks (e.g., the memory block 11 752, the memory block 13 780, the memory block 15 760, the memory block 17 764, the memory block 18 766 and the memory block 19 768) having greater erase counts 710 than the average erase count of 370 as source memory blocks among the memory blocks 750, 752, 754, 756, 758, 760, 762, 764, 766, 768, 770 and 772. Then, the controller 130 may select normal source memory blocks and high priority source memory blocks among the selected source memory blocks (e.g., the memory block 11 752, the memory block 13 780, the memory block 15 760, the memory block 17 764, the memory block 18 766 and the memory block 19 768). The controller 130 may select as the high priority source memory blocks the memory blocks having greater erase count offsets 715 than the threshold erase count offset among the selected source memory blocks (e.g., the memory block 11 752, the memory block 13 780, the memory block 15 760, the memory block 17 764, the memory block 18 766 and the memory block 19 768). For example, when the threshold erase count offset is 150, the controller 130 may select as the high priority source memory blocks the memory block 11 752, the memory block 15 760 and the memory block 17 764 having greater erase count offsets 715 than the threshold erase count offset of 150 among the selected source memory blocks (e.g., the memory block 11 752, the memory block 13 780, the memory block 15 760, the memory block 17 764, the memory block 18 766 and the memory block 19 768); and the controller 130 may select as the normal source memory blocks the memory block 13 780, the memory block 18 766 and the memory block 19 768 having less erase count offsets 715 than the threshold erase count offset of 150 among the selected source memory blocks (e.g., the memory block 11 752, the memory block 13 780, the memory block 15 760, the memory block 17 764, the memory block 18 766 and the memory block 19 768).

The controller 130 may control the memory device 150 to perform a swap operation (i.e., a wear levelling operation) to the source memory blocks (e.g., the memory block 11 752, the memory block 13 780, the memory block 15 760, the memory block 17 764, the memory block 18 766 and the memory block 19 768) selected among the memory blocks 750, 752, 754, 756, 758, 760, 762, 764, 766, 768, 770 and 772. The controller 130 may control the memory device 150 to perform a high priority swap operation (i.e., a wear levelling operation) to the high priority source memory blocks (e.g., the memory block 11 752, the memory block 15 760 and the memory block 17 764) selected among the selected source memory blocks (e.g., the memory block 11 752, the memory block 13 780, the memory block 15 760, the memory block 17 764, the memory block 18 766 and the memory block 19 768). Then, the controller 130 may control the memory device 150 to perform a normal priority swap operation (i.e., a wear levelling operation) to the normal source memory blocks (e.g., the memory block 13 780, the memory block 18 766 and the memory block 19 768) selected among the selected source memory blocks (e.g., the memory block 11 752, the memory block 13 780, the memory block 15 760, the memory block 17 764, the memory block 18 766 and the memory block 19 768). At this time, target data of the high priority swap operation, which are data stored in the memory block 11 752, the memory block 15 760 and the memory block 17 764, may be stored in the second queueing module 830; and target data of the normal priority swap operation, which are data stored in the memory block 13 780, the memory block 18 766 and the memory block 19 768, may be stored in the first queueing module 820.

The controller 130 may store in target memory blocks (e.g., a memory block i−1 774, a memory block i 776 and a memory block i+1 778) the target data stored in the source memory blocks (e.g., the memory block 11 752, the memory block 15 760 and the memory block 17 764; and the memory block 13 780, the memory block 18 766 and the memory block 19 768). The target memory blocks may be selected to have the smallest erase counts among the memory blocks 750, 752, 754, 756, 758, 760, 762, 764, 766, 768, 770 and 772.

The controller 130 may compare an average read count or a threshold read count with the read counts 720 of the parameter table 700 for the respective memory blocks 750, 752, 754, 756, 758, 760, 762, 764, 766, 768, 770 and 772, and may control the memory device 150 to perform a copy operation (i.e., a read reclaim operation) to the memory blocks 750, 752, 754, 756, 758, 760, 762, 764, 766, 768, 770 and 772.

The controller 130 may obtain the average read count and the threshold read count for the memory blocks 750, 752, 754, 756, 758, 760, 762, 764, 766, 768, 770 and 772. When the threshold read count is 650, the controller 130 may select memory blocks (e.g., the memory block 10 750, the memory block 20 770 and the memory block 21 772) having greater read counts 720 than the threshold read count of 650 as source memory blocks among the memory blocks 750, 752, 754, 756, 758, 760, 762, 764, 766, 768, 770 and 772. Then, the controller 130 may control the memory device 150 to perform a copy operation (i.e., a read reclaim operation) to the selected source memory blocks (e.g., the memory block 10 750, the memory block 20 770 and the memory block 21 772). At this time, target data of the copy operation (i.e., a read reclaim operation), which are data stored in the memory block 10 750, the memory block 20 770 and the memory block 21 772, may be stored in the third queueing module 840.

The controller 130 may store in target memory blocks (e.g., a memory block i−1 774, a memory block i 776 and a memory block i+1 778) the target data stored in the source memory blocks (e.g., the memory block 10 750, the memory block 20 770 and the memory block 21 772). The target memory blocks may be empty memory blocks, open memory blocks or free memory blocks among the memory blocks 750, 752, 754, 756, 758, 760, 762, 764, 766, 768, 770 and 772.

The erase counts 710 for the respective memory blocks 750, 752, 754, 756, 758, 760, 762, 764, 766, 768, 770 and 772 may increase as the memory device 150 performs a copy operation (i.e., a read reclaim operation) to the memory blocks 750, 752, 754, 756, 758, 760, 762, 764, 766, 768, 770 and 772. Therefore, the controller 130 may control the memory device 150 to perform a swap operation (i.e., a wear levelling operation) to the memory blocks 750, 752, 754, 756, 758, 760, 762, 764, 766, 768, 770 and 772 according to the read reclaim operation performed to the memory blocks 750, 752, 754, 756, 758, 760, 762, 764, 766, 768, 770 and 772.

The controller 130 may compare an average read reclaim count or a threshold read reclaim count with the read reclaim counts 725 of the parameter table 700 for the respective memory blocks 750, 752, 754, 756, 758, 760, 762, 764, 766, 768, 770 and 772, and may control the memory device 150 to perform a swap operation (i.e., a wear levelling operation) to the memory blocks 750, 752, 754, 756, 758, 760, 762, 764, 766, 768, 770 and 772 according to the result of the comparison. Also, the controller 130 may compare an average read reclaim count offset or a threshold read reclaim count offset with the read reclaim count offsets 730 of the parameter table 700 for the respective memory blocks 750, 752, 754, 756, 758, 760, 762, 764, 766, 768, 770 and 772, and may control the memory device 150 to perform a swap operation (i.e., a wear levelling operation) to the memory blocks 750, 752, 754, 756, 758, 760, 762, 764, 766, 768, 770 and 772 according to the result of the comparison.

The controller 130 may obtain the average read reclaim count and the threshold read reclaim count for the memory blocks 750, 752, 754, 756, 758, 760, 762, 764, 766, 768, 770 and 772. When the threshold read reclaim count is 270, the controller 130 may select memory blocks (e.g., the memory block 10 750, the memory block 20 770 and the memory block 21 772) having greater read reclaim counts 725 than the threshold read reclaim count of 270 as source memory blocks among the memory blocks 750, 752, 754, 756, 758, 760, 762, 764, 766, 768, 770 and 772. Also, the controller 130 may obtain the average read reclaim count offset and the threshold read reclaim count offset for the memory blocks 750, 752, 754, 756, 758, 760, 762, 764, 766, 768, 770 and 772. When the threshold read reclaim count offset is 120, the controller 130 may select memory blocks (e.g., the memory block 10 750, the memory block 20 770 and the memory block 21 772) having greater read reclaim count offsets 730 than the threshold read reclaim count offset of 120 as source memory blocks among the memory blocks 750, 752, 754, 756, 758, 760, 762, 764, 766, 768, 770 and 772.

The controller 130 may control the memory device 150 to perform a swap operation (i.e., a wear levelling operation) to the memory blocks 750, 752, 754, 756, 758, 760, 762, 764, 766, 768, 770 and 772. The controller 130 may control the memory device 150 to perform normal or high priority swap operation (i.e., a wear levelling operation) to the source memory blocks (e.g., the memory block 10 750, the memory block 20 770 and the memory block 21 772). The controller 130 may control the memory device 150 to perform the high priority swap operation (i.e., a wear levelling operation) to the source memory blocks (e.g., the memory block 10 750, the memory block 20 770 and the memory block 21 772) according to the copy operation (i.e., the read reclaim operation) performed to the memory blocks 750, 752, 754, 756, 758, 760, 762, 764, 766, 768, 770 and 772.

For example, when the controller 130 controls the memory device 150 to perform a normal priority swap operation to the source memory blocks (e.g., the memory block 10 750, the memory block 20 770 and the memory block 21 772), the controller 130 may control the memory device 150 to suspend the read reclaim operation to the memory blocks 750, 752, 754, 756, 758, 760, 762, 764, 766, 768, 770 and 772 due to the read operations performed to the memory blocks 750, 752, 754, 756, 758, 760, 762, 764, 766, 768, 770 and 772 and then may trigger the normal priority swap operation to the source memory blocks (e.g., the memory block 10 750, the memory block 20 770 and the memory block 21 772). As the normal priority swap operation is triggered during the read operations and read reclaim operations to the memory blocks 750, 752, 754, 756, 758, 760, 762, 764, 766, 768, 770 and 772, the read operation and read reclaim operations may be suspended and may become to have a lower priority than the normal priority swap operation. Accordingly, the controller 130 may perform a higher priority swap operation to the source memory blocks (e.g., the memory block 10 750, the memory block 20 770 and the memory block 21 772) in order to secure the read reclaim operations to the memory blocks 750, 752, 754, 756, 758, 760, 762, 764, 766, 768, 770 and 772. Therefore, the controller 130 may control the memory device 150 to switch the copy operation (i.e., the read reclaim operation) to the swap operation (i.e., the wear levelling operation) to the memory blocks 750, 752, 754, 756, 758, 760, 762, 764, 766, 768, 770 and 772.

The controller 130 may store in the third queueing module 840 target data of the read reclaim operations, which are stored in the source memory blocks (e.g., the memory block 10 750, the memory block 20 770 and the memory block 21 772) and may store in the second queueing module 830 target data of the wear levelling operations, which are stored in the source memory blocks (e.g., the memory block 10 750, the memory block 20 770 and the memory block 21 772). With the second queueing module 830 and the third queueing module 840, the controller 130 may control the memory device 150 to switch the swap operation and the copy operation to the source memory blocks (e.g., the memory block 10 750, the memory block 20 770 and the memory block 21 772). The controller 130 may control the memory device 150 to perform the high priority operation to the source memory blocks (e.g., the memory block 10 750, the memory block 20 770 and the memory block 21 772) and store in the second queueing module 830 target data of the swap operation, which are stored in the source memory blocks (e.g., the memory block 10 750, the memory block 20 770 and the memory block 21 772). Also, the controller 130 may control the memory device 150 to store in the target memory blocks (i.e., a memory block i−1 774, a memory block i 776 and a memory block i+1 778) target data stored in the source memory blocks (e.g., the memory block 10 750, the memory block 20 770 and the memory block 21 772). The target memory blocks may have smallest erase counts among the memory blocks 750, 752, 754, 756, 758, 760, 762, 764, 766, 768, 770 and 772.

As described above, in accordance with an embodiment of the present invention, when the memory device 150 performs a plurality of command operations in response to a plurality of commands provided from the host 102, the controller 130 may identify the parameters of the memory blocks of the memory device 150 and control the memory device 150 to perform a swap operation (i.e., a wear levelling operation) and a copy operation (i.e., a read reclaim operation) to the memory blocks according to the parameters for the respective memory blocks. Further, the controller 130 may control the memory device 150 to perform a swap operation (i.e., a wear levelling operation) to the memory blocks according to the parameters affected by a copy operation performed to the memory blocks. The controller 130 may determine priorities of swap and copy operations to be performed to the memory blocks of the memory device 150 according to types of the swap and copy operations; may schedule queues in the memory 144 for the respective types of the swap and copy operations to be performed to the memory blocks of the memory device 150 according to the priorities of the swap and copy operations; and assign queueing modules to buffers or caches to store target data of the swap and copy operations. Described hereinafter in detail with reference to FIG. 9 will be a data processing of the memory system in accordance with an embodiment of the present invention.

Figure 9:
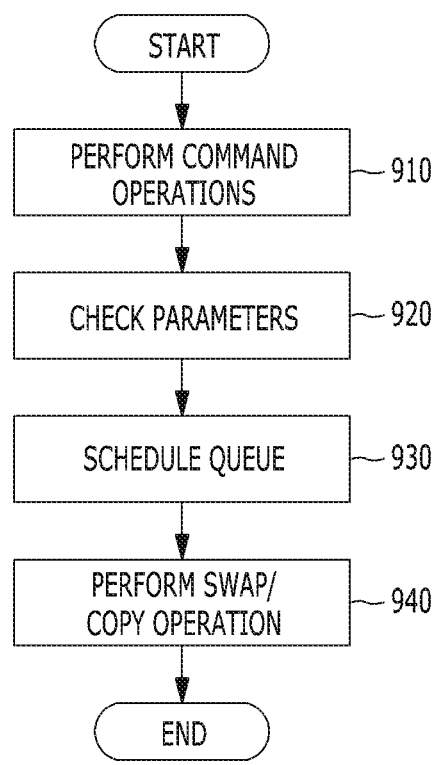
FIG. 9 is a flowchart describing an operation of processing data in the memory system in accordance with an embodiment of the present invention.

FIG. 9 is a flowchart describing an operation of processing data in the memory system in accordance with an embodiment of the present invention.

Referring to FIG. 9, at step 910, the memory system 110 may perform a plurality of command operations in response to a plurality of commands provided from the host 102.

At step 920, the memory system 110 may identify the parameters for the memory blocks of the memory device 150 affected by the performed command operations. Further, the memory system 110 may identify the offsets of the parameters for the memory blocks. A parameter offset is the difference of a parameter value for a memory block from an average value of the parameter for a plurality of memory blocks.

At step 930, the memory system 110 may schedule queues of swap and copy operations to be performed to the memory blocks according to the parameters and their offsets for the memory blocks in order to perform the swap and copy operations to the memory blocks according to the parameters and the offsets for the memory blocks. The memory system 110 may determine priorities of the swap and copy operations to be performed to the memory blocks according to types of the swap and copy operations, and schedule queues in the memory 144 for the respective types of the swap and copy operations to be performed to the memory blocks according to the priorities of the swap and copy operations.

At step 940, the memory system 110 may perform the swap operation (i.e., a wear levelling operation) and the copy operation (i.e., a read reclaim operation) to the memory blocks according to the parameters for the respective memory blocks. Further, the memory system 110 may perform a swap operation (i.e., a wear levelling operation) to the memory blocks according to the parameters affected by a copy operation (i.e., a read reclaim operation) performed to the memory blocks.

Since the steps 910 to 940 are described earlier with reference to FIGS. 5 to 8, further description will be omitted herein.

Hereafter, a data processing system and electronic devices to which the memory system 110 including the memory device 150 and the controller 130 which are described above by referring to FIGS. 1 to 9 is applied will be described in detail with reference to FIGS. 10 to 18.

Figure 10:
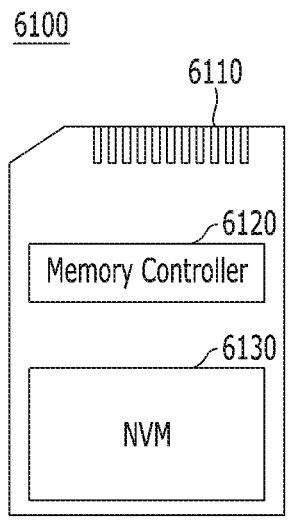
FIGS. 10 to 18 are diagrams schematically illustrating application examples of the data processing system shown in FIG. 1, in accordance with various embodiment of the present invention.

FIG. 10 is a diagram schematically illustrating another example of the data processing system including the memory system in accordance with the present embodiment. FIG. 10 schematically illustrates a memory card system to which the memory system in accordance with the present embodiment is applied.

Referring to FIG. 10, the memory card system 6100 may include a memory controller 6120, a memory device 6130 and a connector 6110.

More specifically, the memory controller 6120 may be connected to the memory device 6130 embodied by a nonvolatile memory, and configured to access the memory device 6130. For example, the memory controller 6120 may be configured to control read, write, erase and background operations of the memory device 6130. The memory controller 6120 may be configured to provide an interface between the memory device 6130 and a host, and drive firmware for controlling the memory device 6130. That is, the memory controller 6120 may correspond to the controller 130 of the memory system 110 described with reference to FIG. 1, and the memory device 6130 may correspond to the memory device 150 of the memory system 110 described with reference to FIG. 1.

Thus, the memory controller 6120 may include a RAM, a processing unit, a host interface, a memory interface and an error correction unit.

The memory controller 6120 may communicate with an external device, for example, the host 102 of FIG. 1 through the connector 6110. For example, as described with reference to FIG. 1, the memory controller 6120 may be configured to communicate with an external device through one or more of various communication protocols such as universal serial bus (USB), multimedia card (MMC), embedded MMC (eMMC), peripheral component interconnection (PCI), PCI express (PCIe), Advanced Technology Attachment (ATA), Serial-ATA, Parallel-ATA, small computer system interface (SCSI), enhanced small disk interface (EDSI), Integrated Drive Electronics (IDE), Firewire, universal flash storage (UFS), WIFI and Bluetooth. Thus, the memory system and the data processing system in accordance with the present embodiment may be applied to wired/wireless electronic devices or particularly mobile electronic devices.

The memory device 6130 may be implemented by a nonvolatile memory. For example, the memory device 6130 may be implemented by various nonvolatile memory devices such as an erasable and programmable ROM (EPROM), an electrically erasable and programmable ROM (EEPROM), a NAND flash memory, a NOR flash memory, a phase-change RAM (PRAM), a resistive RAM (ReRAM), a ferroelectric RAM (FRAM) and a spin torque transfer magnetic RAM (STT-RAM).

The memory controller 6120 and the memory device 6130 may be integrated into a single semiconductor device. For example, the memory controller 6120 and the memory device 6130 may construct a solid-state driver (SSD) by being integrated into a single semiconductor device. Also, the memory controller 6120 and the memory device 6130 may construct a memory card such as a PC card (PCMCIA: Personal Computer Memory Card International Association), a compact flash (CF) card, a smart media card (e.g., SM and SMC), a memory stick, a multimedia card (e.g., MMC, RS-MMC, MMCmicro and eMMC), an SD card (e.g., SD, miniSD, microSD and SDHC) and a universal flash storage (UFS).

Figure 11:
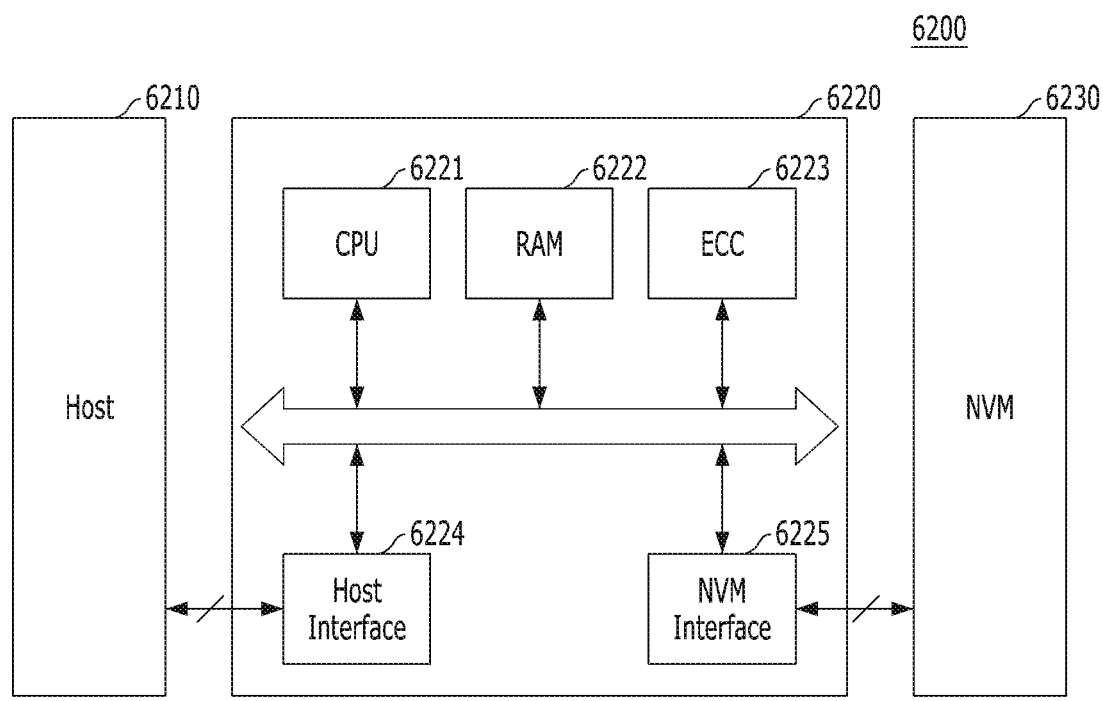

FIG. 11 is a diagram schematically illustrating another example of the data processing system including the memory system in accordance with the present embodiment.

Referring to FIG. 11, the data processing system 6200 may include a memory device 6230 having one or more nonvolatile memories and a memory controller 6220 for controlling the memory device 6230. The data processing system 6200 illustrated in FIG. 11 may serve as a storage medium such as a memory card (CF, SD, micro-SD or the like) or USB device, as described with reference to FIG. 1. The memory device 6230 may correspond to the memory device 150 in the memory system 110 illustrated in FIG. 1, and the memory controller 6220 may correspond to the controller 130 in the memory system 110 illustrated in FIG. 1.

The memory controller 6220 may control a read, write or erase operation on the memory device 6230 in response to a request of the host 6210, and the memory controller 6220 may include one or more CPUs 6221, a buffer memory such as RAM 6222, an ECC circuit 6223, a host interface 6224 and a memory interface such as an NVM interface 6225.

The CPU 6221 may control overall operations on the memory device 6230, for example, read, write, file system management and bad page management operations. The RAM 6222 may be operated according to control of the CPU 6221, and used as a work memory, buffer memory or cache memory. When the RAM 6222 is used as a work memory, data processed by the CPU 6221 may be temporarily stored in the RAM 6222. When the RAM 6222 is used as a buffer memory, the RAM 6222 may be used for buffering data transmitted to the memory device 6230 from the host 6210 or transmitted to the host 6210 from the memory device 6230. When the RAM 6222 is used as a cache memory, the RAM 6222 may assist the low-speed memory device 6230 to operate at high speed.

The ECC circuit 6223 may correspond to the ECC unit 138 illustrated in FIG. 1. As described with reference to FIG. 1, the ECC circuit 6223 may generate an ECC (Error Correction Code) for correcting a fail bit or error bit of data provided from the memory device 6230. The ECC circuit 6223 may perform error correction encoding on data provided to the memory device 6230, thereby forming data with a parity bit. The parity bit may be stored in the memory device 6230. The ECC circuit 6223 may perform error correction decoding on data outputted from the memory device 6230. At this time, the ECC circuit 6223 may correct an error using the parity bit. For example, as described with reference to FIG. 1, the ECC circuit 6223 may correct an error using the LDPC code, BCH code, turbo code, Reed-Solomon code, convolution code, RSC or coded modulation such as TCM or BCM.

The memory controller 6220 may transmit/receive data to/from the host 6210 through the host interface 6224, and transmit/receive data to/from the memory device 6230 through the NVM interface 6225. The host interface 6224 may be connected to the host 6210 through a PATA bus, SATA bus, SCSI, USB, PCIe or NAND interface. The memory controller 6220 may have a wireless communication function with a mobile communication protocol such as WiFi or Long Term Evolution (LTE). The memory controller 6220 may be connected to an external device, for example, the host 6210 or another external device, and then transmit/receive data to/from the external device. In particular, as the memory controller 6220 is configured to communicate with the external device through one or more of various communication protocols, the memory system and the data processing system in accordance with the present embodiment may be applied to wired/wireless electronic devices or particularly a mobile electronic device.

Figure 12:
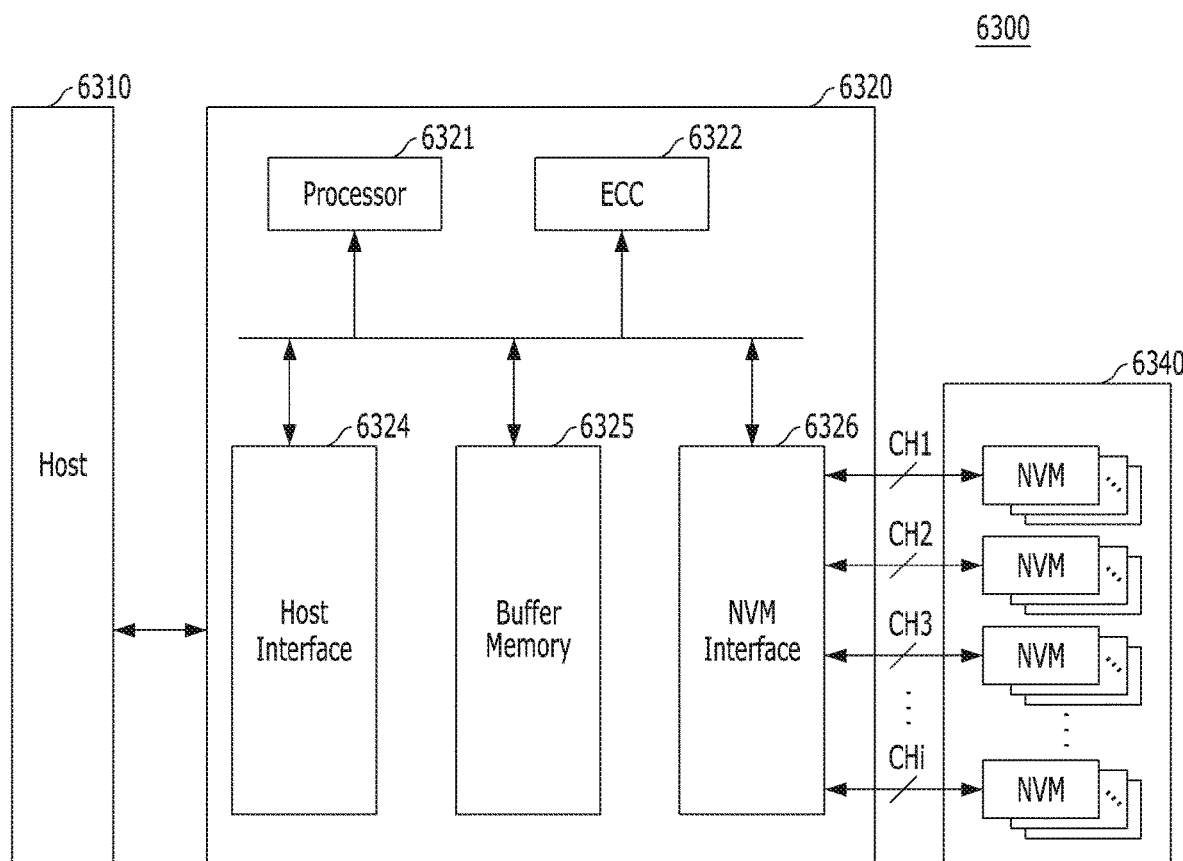

FIG. 12 is a diagram schematically illustrating another example of the data processing system including the memory system in accordance with the present embodiment. FIG. 12 schematically illustrates an SSD to which the memory system in accordance with the present embodiment is applied.

Referring to FIG. 12, the SSD 6300 may include a controller 6320 and a memory device 6340 including a plurality of nonvolatile memories. The controller 6320 may correspond to the controller 130 in the memory system 110 of FIG. 1, and the memory device 6340 may correspond to the memory device 150 in the memory system of FIG. 1

More specifically, the controller 6320 may be connected to the memory device 6340 through a plurality of channels CH1 to CHi. The controller 6320 may include one or more processors 6321, a buffer memory 6325, an ECC circuit 6322, a host interface 6324 and a memory interface, for example, a nonvolatile memory interface 6326.

The buffer memory 6325 may temporarily store data provided from the host 6310 or data provided from a plurality of flash memories NVM included in the memory device 6340, or temporarily store meta data of the plurality of flash memories NVM, for example, map data including a mapping table. The buffer memory 6325 may be embodied by volatile memories such as DRAM, SDRAM, DDR SDRAM, LPDDR SDRAM and GRAM or nonvolatile memories such as FRAM, ReRAM, STT-MRAM and PRAM. For convenience of description, FIG. 8 illustrates that the buffer memory 6325 exists in the controller 6320. However, the buffer memory 6325 may exist outside the controller 6320.

The ECC circuit 6322 may calculate an ECC value of data to be programmed to the memory device 6340 during a program operation, perform an error correction operation on data read from the memory device 6340 based on the ECC value during a read operation, and perform an error correction operation on data recovered from the memory device 6340 during a failed data recovery operation.

The host interface 6324 may provide an interface function with an external device, for example, the host 6310, and the nonvolatile memory interface 6326 may provide an interface function with the memory device 6340 connected through the plurality of channels.

Furthermore, a plurality of SSDs 6300 to which the memory system 110 of FIG. 1 is applied may be provided to embody a data processing system, for example, RAID (Redundant Array of Independent Disks) system. At this time, the RAID system may include the plurality of SSDs 6300 and a RAID controller for controlling the plurality of SSDs 6300. When the RAID controller performs a program operation in response to a write command provided from the host 6310, the RAID controller may select one or more memory systems or SSDs 6300 according to a plurality of RAID levels, that is, RAID level information of the write command provided from the host 6310 in the SSDs 6300, and output data in response to the write command to the selected SSDs 6300. Furthermore, when the RAID controller performs a read command in response to a read command provided from the host 6310, the RAID controller may select one or more memory systems or SSDs 6300 according to a plurality of RAID levels, that is, RAID level information of the read command provided from the host 6310 in the SSDs 6300, and provide data read from the selected SSDs 6300 to the host 6310.

Figure 13:
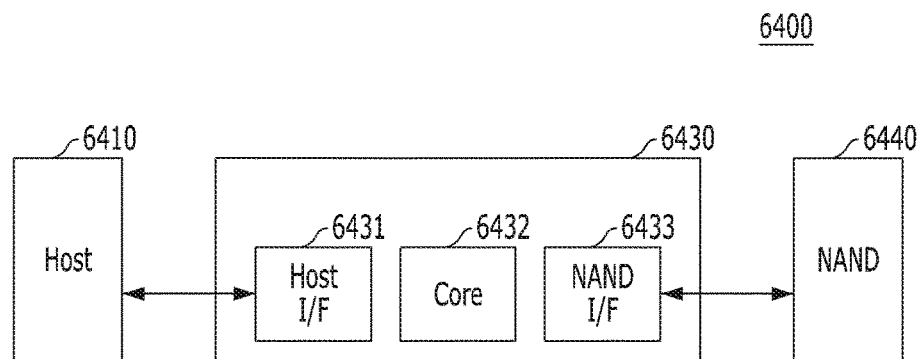

FIG. 13 is a diagram schematically illustrating another example of the data processing system including the memory system in accordance with the present embodiment. FIG. 13 schematically illustrates an embedded Multi-Media Card (eMMC) to which the memory system in accordance with the present embodiment is applied.

Referring to FIG. 13, the eMMC 6400 may include a controller 6430 and a memory device 6440 embodied by one or more NAND flash memories. The controller 6430 may correspond to the controller 130 in the memory system 110 of FIG. 1, and the memory device 6440 may correspond to the memory device 150 in the memory system 110 of FIG. 1.

More specifically, the controller 6430 may be connected to the memory device 6440 through a plurality of channels. The controller 6430 may include one or more cores 6432, a host interface 6431 and a memory interface, for example, a NAND interface 6433.

The core 6432 may control overall operations of the eMMC 6400, the host interface 6431 may provide an interface function between the controller 6430 and the host 6410, and the NAND interface 6433 may provide an interface function between the memory device 6440 and the controller 6430. For example, the host interface 6431 may serve as a parallel interface, for example, MMC interface as described with reference to FIG. 1. Furthermore, the host interface 6431 may serve as a serial interface, for example, UHS ((Ultra High Speed)-I/UHS-II) interface.

FIGS. 14 to 17 are diagrams schematically illustrating other examples of the data processing system including the memory system in accordance with the present embodiment. FIGS. 14 to 17 schematically illustrate UFS (Universal Flash Storage) systems to which the memory system in accordance with the present embodiment is applied.

Referring to FIGS. 14 to 17, the UFS systems 6500, 6600, 6700 and 6800 may include hosts 6510, 6610, 6710 and 6810, UFS devices 6520, 6620, 6720 and 6820 and UFS cards 6530, 6630, 6730 and 6830, respectively. The hosts 6510, 6610, 6710 and 6810 may serve as application processors of wired/wireless electronic devices or particularly mobile electronic devices, the UFS devices 6520, 6620, 6720 and 6820 may serve as embedded UFS devices, and the UFS cards 6530, 6630, 6730 and 6830 may serve as external embedded UFS devices or removable UFS cards.

The hosts 6510, 6610, 6710 and 6810, the UFS devices 6520, 6620, 6720 and 6820 and the UFS cards 6530, 6630, 6730 and 6830 in the respective UFS systems 6500, 6600, 6700 and 6800 may communicate with external devices, for example, wired/wireless electronic devices or particularly mobile electronic devices through UFS protocols, and the UFS devices 6520, 6620, 6720 and 6820 and the UFS cards 6530, 6630, 6730 and 6830 may be embodied by the memory system 110 illustrated in FIG. 1. For example, in the UFS systems 6500, 6600, 6700 and 6800, the UFS devices 6520, 6620, 6720 and 6820 may be embodied in the form of the data processing system 6200, the SSD 6300 or the eMMC 6400 described with reference to FIGS. 11 to 13, and the UFS cards 6530, 6630, 6730 and 6830 may be embodied in the form of the memory card system 6100 described with reference to FIG. 10.

Furthermore, in the UFS systems 6500, 6600, 6700 and 6800, the hosts 6510, 6610, 6710 and 6810, the UFS devices 6520, 6620, 6720 and 6820 and the UFS cards 6530, 6630, 6730 and 6830 may communicate with each other through an UFS interface, for example, MIPI M-PHY and MIPI UniPro (Unified Protocol) in MIPI (Mobile Industry Processor Interface). Furthermore, the UFS devices 6520, 6620, 6720 and 6820 and the UFS cards 6530, 6630, 6730 and 6830 may communicate with each other through various protocols other than the UFS protocol, for example, UFDs, MMC, SD, mini-SD, and micro-SD.

Figure 14:
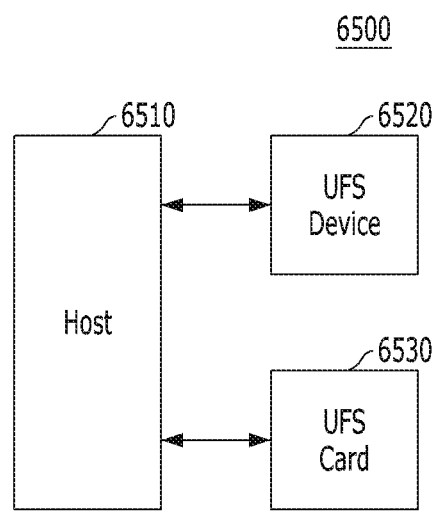

In the UFS system 6500 illustrated in FIG. 14, each of the host 6510, the UFS device 6520 and the UFS card 6530 may include UniPro. The host 6510 may perform a switching operation in order to communicate with the UFS device 6520 and the UFS card 6530. In particular, the host 6510 may communicate with the UFS device 6520 or the UFS card 6530 through link layer switching, for example, L3 switching at the UniPro. At this time, the UFS device 6520 and the UFS card 6530 may communicate with each other through link layer switching at the UniPro of the host 6510. In the present embodiment, the configuration in which one UFS device 6520 and one UFS card 6530 are connected to the host 6510 has been exemplified for convenience of description. However, a plurality of UFS devices and UFS cards may be connected in parallel or in the form of a star to the host 6410, and a plurality of UFS cards may be connected in parallel or in the form of a star to the UFS device 6520 or connected in series or in the form of a chain to the UFS device 6520.

Figure 15:
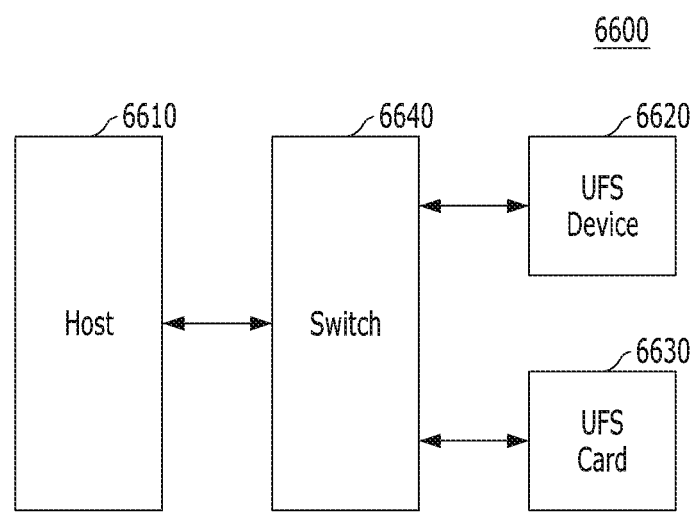

In the UFS system 6600 illustrated in FIG. 15, each of the host 6610, the UFS device 6620 and the UFS card 6630 may include UniPro, and the host 6610 may communicate with the UFS device 6620 or the UFS card 6630 through a switching module 6640 performing a switching operation, for example, through the switching module 6640 which performs link layer switching at the UniPro, for example, L3 switching. The UFS device 6620 and the UFS card 6630 may communicate with each other through link layer switching of the switching module 6640 at UniPro. In the present embodiment, the configuration in which one UFS device 6620 and one UFS card 6630 are connected to the switching module 6640 has been exemplified for convenience of description. However, a plurality of UFS devices and UFS cards may be connected in parallel or in the form of a star to the switching module 6640, and a plurality of UFS cards may be connected in series or in the form of a chain to the UFS device 6620.

Figure 16:
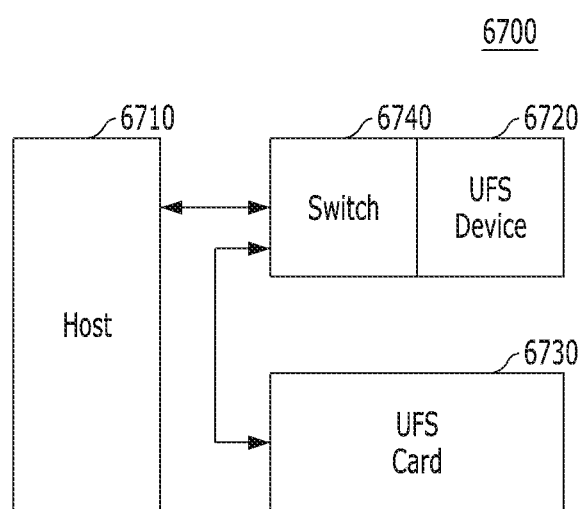

In the UFS system 6700 illustrated in FIG. 16, each of the host 6710, the UFS device 6720 and the UFS card 6730 may include UniPro, and the host 6710 may communicate with the UFS device 6720 or the UFS card 6730 through a switching module 6740 performing a switching operation, for example, through the switching module 6740 which performs link layer switching at the UniPro, for example, L3 switching. At this time, the UFS device 6720 and the UFS card 6730 may communicate with each other through link layer switching of the switching module 6740 at the UniPro, and the switching module 6740 may be integrated as one module with the UFS device 6720 inside or outside the UFS device 6720. In the present embodiment, the configuration in which one UFS device 6720 and one UFS card 6730 are connected to the switching module 6740 has been exemplified for convenience of description. However, a plurality of modules each including the switching module 6740 and the UFS device 6720 may be connected in parallel or in the form of a star to the host 6710 or connected in series or in the form of a chain to each other. Furthermore, a plurality of UFS cards may be connected in parallel or in the form of a star to the UFS device 6720.

Figure 17:
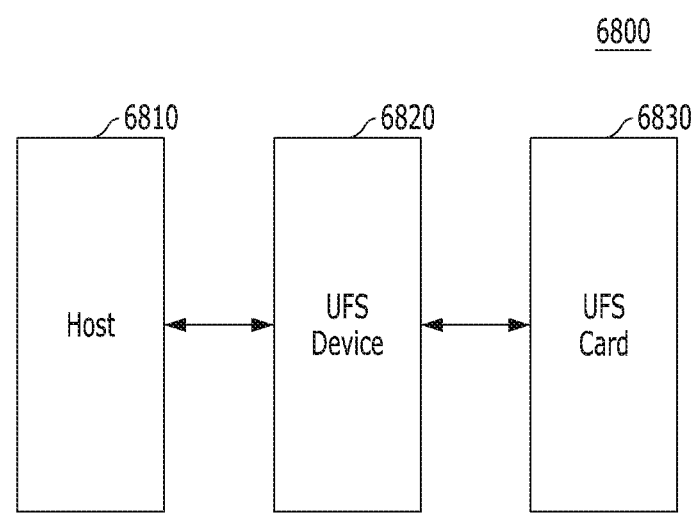

In the UFS system 6800 illustrated in FIG. 17, each of the host 6810, the UFS device 6820 and the UFS card 6830 may include M-PHY and UniPro. The UFS device 6820 may perform a switching operation in order to communicate with the host 6810 and the UFS card 6830. In particular, the UFS device 6820 may communicate with the host 6810 or the UFS card 6830 through a switching operation between the M-PHY and UniPro module for communication with the host 6810 and the M-PHY and UniPro module for communication with the UFS card 6830, for example, through a target ID (Identifier) switching operation. At this time, the host 6810 and the UFS card 6830 may communicate with each other through target ID switching between the M-PHY and UniPro modules of the UFS device 6820. In the present embodiment, the configuration in which one UFS device 6820 is connected to the host 6810 and one UFS card 6830 is connected to the UFS device 6820 has been exemplified for convenience of description. However, a plurality of UFS devices may be connected in parallel or in the form of a star to the host 6810, or connected in series or in the form of a chain to the host 6810, and a plurality of UFS cards may be connected in parallel or in the form of a star to the UFS device 6820, or connected in series or in the form of a chain to the UFS device 6820.

Figure 18:
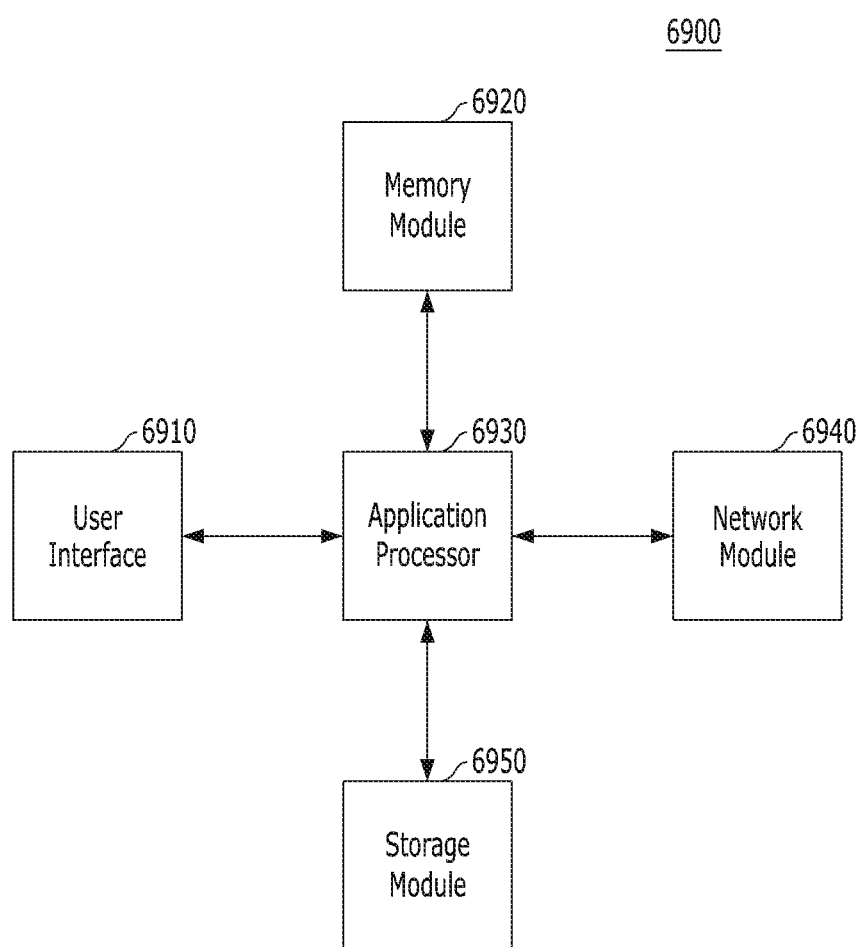

FIG. 18 is a diagram schematically illustrating another example of the data processing system including the memory system in accordance with an embodiment. FIG. 18 is a diagram schematically illustrating a user system to which the memory system in accordance with the present embodiment is applied.

Referring to FIG. 18, the user system 6900 may include an application processor 6930, a memory module 6920, a network module 6940, a storage module 6950 and a user interface 6910.

More specifically, the application processor 6930 may drive components included in the user system 6900, for example, an OS, and include controllers, interfaces and a graphic engine which control the components included in the user system 6900. The application processor 6930 may be provided as System-on-Chip (SoC).

The memory module 6920 may be used as a main memory, work memory, buffer memory or cache memory of the user system 6900. The memory module 6920 may include a volatile RAM such as DRAM, SDRAM, DDR SDRAM, DDR2 SDRAM, DDR3 SDRAM, LPDDR SDARM, LPDDR3 SDRAM or LPDDR3 SDRAM or a nonvolatile RAM such as PRAM, ReRAM, MRAM or FRAM. For example, the application processor 6930 and the memory module 6920 may be packaged and mounted, based on POP (Package on Package).

The network module 6940 may communicate with external devices. For example, the network module 6940 may not only support wired communication, but also support various wireless communication protocols such as code division multiple access (CDMA), global system for mobile communication (GSM), wideband CDMA (WCDMA), CDMA-2000, time division multiple access (TDMA), long term evolution (LTE), worldwide interoperability for microwave access (Wimax), wireless local area network (WLAN), ultra-wideband (UWB), Bluetooth, wireless display (WI-DI), thereby communicating with wired/wireless electronic devices or particularly mobile electronic devices. Therefore, the memory system and the data processing system, in accordance with an embodiment of the present invention, can be applied to wired/wireless electronic devices. The network module 6940 may be included in the application processor 6930.

The storage module 6950 may store data, for example, data from the application processor 6930, and then may transmit the stored data to the application processor 6930. The storage module 6950 may be embodied by a nonvolatile semiconductor memory device such as a phase-change RAM (PRAM), a magnetic RAM (MRAM), a resistive RAM (ReRAM), a NAND flash, NOR flash and 3D NAND flash, and provided as a removable storage medium such as a memory card or external drive of the user system 6900. The storage module 6950 may correspond to the memory system 110 described with reference to FIG. 1. Furthermore, the storage module 6950 may be embodied as an SSD, eMMC and UFS as described above with reference to FIGS. 12 to 17.

The user interface 6910 may include interfaces for inputting data or commands to the application processor 6930 or outputting data to an external device. For example, the user interface 6910 may include user input interfaces such as a keyboard, a keypad, a button, a touch panel, a touch screen, a touch pad, a touch ball, a camera, a microphone, a gyroscope sensor, a vibration sensor and a piezoelectric element, and user output interfaces such as a liquid crystal display (LCD), an organic light emitting diode (OLED) display device, an active matrix OLED (AMOLED) display device, an LED, a speaker and a motor.

Furthermore, when the memory system 110 of FIG. 1 is applied to a mobile electronic device of the user system 6900, the application processor 6930 may control overall operations of the mobile electronic device, and the network module 6940 may serve as a communication module for controlling wired/wireless communication with an external device. The user interface 6910 may display data processed by the processor 6930 on a display/touch module of the mobile electronic device, or support a function of receiving data from the touch panel.

According to the embodiments of the present invention, the memory system and a method for operating the memory system are capable of processing data with a memory device quickly and stably by minimizing the complexity and performance deterioration of the memory system and maximizing the utility efficiency of the memory device.

While the present invention has been described with respect to the specific embodiments, it will be apparent to those skilled in the art that various changes and modifications may be made without departing from the spirit and scope of the invention as defined in the following claims.

What is claimed is:

1. A memory system comprising:
   a memory device including a plurality of memory blocks each having a plurality of pages suitable for storing data; and
   a controller suitable for:
   receiving a plurality of commands from a host;
   controlling the memory device to perform a plurality of command operations in response to the plurality of commands;
   identifying parameters for the memory blocks affected by the command operations performed to the memory blocks;
   selecting first memory blocks among the memory blocks according to the parameters; and
   controlling the memory device to swap data stored in the first memory blocks to second memory blocks among the memory blocks,
   wherein the parameters include first and second parameters, and
   wherein the controller:
   sets the first memory blocks as a first memory block group and a second memory block group according to the first parameters;
   controls the memory device to perform a first swap operation to the first memory block group; and
   controls the memory device to perform a second swap operation to the second memory block group.

2. The memory system of claim 1, wherein the controller includes a first memory and is further suitable for assigning a first region for the first swap operation and a second region for the second swap operation in the first memory.

3. The memory system of claim 2, wherein the controller controls the memory device to swap data by:
   determining to perform the first swap operation according to the first parameters; and
   determining to perform the second swap operation according to offsets of the first parameters.

4. The memory system of claim 3,
   wherein the controller is suitable for controlling the memory device to perform the second swap operation with higher priority to the first swap operation, and
   wherein the second swap operation has greater operating rate than the first swap operation.

5. The memory system of claim 2, wherein the controller is further suitable for:
   selecting third memory blocks among the memory blocks according to the second parameters; and
   controlling the memory device to perform a copy operation of copying data stored in the third memory blocks into fourth memory blocks among the memory blocks.

6. The memory system of claim 5,
   wherein the controller identifies the parameters further by identifying third parameters for the respective third memory blocks and offsets of the third parameters affected by the copy operation performed to the third memory blocks, and
   wherein the controller controls the memory device to swap data further by determining to perform the second swap operation to the third memory blocks according to the third parameters or the offsets of the third parameters.

7. The memory system of claim 6, wherein the controller is further suitable for assigning a third region for the copy operation in the first memory.

8. The memory system of claim 7, wherein the controller controls the memory device to perform the second swap operation and to perform the copy operation by controlling the memory device to switch between the second swap operation and the copy operation according to the second region and the third region.

9. The memory system of claim 1,
wherein the first parameters are determined according to command operations performed in response to program commands or erase commands provided from the host, and
wherein the second parameters are determined according to command operations performed in response to read commands provided from the host.

10. An operating method of a memory system, the method comprising:
receiving a plurality of commands from a host, the commands for a memory device including a plurality of memory blocks each having a plurality of pages each suitable for storing data;
controlling the memory device to perform a plurality of command operations in response to the plurality of commands;
identifying parameters for the memory blocks affected by the command operations performed to the memory blocks;
selecting first memory blocks among the memory blocks according to the parameters; and
controlling the memory device to swap data stored in the first memory blocks to second memory blocks among the memory blocks,
wherein the identifying of the parameters includes identifying first and second parameters for the memory blocks, and
wherein the controlling of the memory device to swap data includes:
setting the first memory blocks as a first memory block group and a second memory block group according to the first parameters;
controlling the memory device to perform a first swap operation to the first memory block group; and
controlling the memory device to perform a second swap operation to the second memory block group.

11. The method of claim 10, further comprising assigning a first region for the first swap operation and a second region for the second swap operation in a first memory included in a controller of the memory device.

12. The method of claim 11, wherein the controlling of the memory device to swap data includes:
determining to perform the first swap operation according to the first parameters; and
determining to perform the second swap operation according to offsets of the first parameters.

13. The method of claim 12,
wherein the controlling of the memory device to swap data includes controlling the memory device to perform the second swap operation with higher priority to the first swap operation, and
wherein the second swap operation has greater operating rate than the first swap operation.

14. The method of claim 11, further comprising:
selecting third memory blocks among the memory blocks according to the second parameters; and
controlling the memory device to perform a copy operation of copying data stored in the third memory blocks into fourth memory blocks among the memory blocks.

15. The method of claim 14,
wherein the identifying of the parameters further includes identifying third parameters for the respective third memory blocks and offsets of the third parameters affected by the copy operation performed to the third memory blocks, and
wherein the controlling of the memory device to swap data further includes determining to perform the second swap operation to the third memory blocks according to the third parameters or the offsets of the third parameters.

16. The method of claim 15, further comprising assigning a third region for the copy operation in the first memory.

17. The method of claim 16, wherein the controlling of the memory device to perform the second swap operation and the controlling of the memory device to perform the copy operation are performed by controlling the memory device to switch between the second swap operation and the copy operation according to the second region and the third region.

18. The method of claim 10,
wherein the first parameters are determined according to command operations performed in response to program commands or erase commands provided from the host, and
wherein the second parameters are determined according to command operations performed in response to read commands provided from the host.

* * * * *